US012750697B2

United States Patent
(12) United States Patent
Chen et al.

(10) Patent No.: US 12,750,697 B2
(45) Date of Patent: Sep. 29, 2026

(54) DATA TRANSMISSION METHOD, USER EQUIPMENT, SERVICE NODE AND STORAGE MEDIUM

(71) Applicant: ZTE CORPORATION, Shenzhen (CN)

(72) Inventors: Lin Chen, Shenzhen (CN); Mengzhen Wang, Shenzhen (CN); Wei Luo, Shenzhen (CN); Ying Huang, Shenzhen (CN); Weiqiang Du, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 303 days.

(21) Appl. No.: 18/565,789

(22) PCT Filed: May 31, 2022

(86) PCT No.: PCT/CN2022/096114
§ 371 (c)(1),
(2) Date: Nov. 30, 2023

(87) PCT Pub. No.: WO2022/257808
PCT Pub. Date: Dec. 15, 2022

(65) Prior Publication Data
US 2024/0276243 A1 Aug. 15, 2024

(30) Foreign Application Priority Data
Jun. 7, 2021 (CN) ........................ 202110633948.0

(51) Int. Cl.
*H04W 24/02* (2009.01)
*H04W 8/00* (2009.01)
(Continued)

(52) U.S. Cl.
CPC .......... *H04W 24/02* (2013.01); *H04W 8/005* (2013.01); *H04W 24/10* (2013.01); *H04W 76/20* (2018.02); *H04W 92/18* (2013.01)

(58) Field of Classification Search
CPC ...... H04L 45/24; H04W 24/02; H04W 24/10; H04W 4/40; H04W 4/70; H04W 40/22;
(Continued)

(56) References Cited

U.S. PATENT DOCUMENTS

2016/0044726 A1 2/2016 Enomoto et al.
2016/0128123 A1 5/2016 Li
(Continued)

FOREIGN PATENT DOCUMENTS

CN 108391285 A 8/2018
EP 4106410 A1 12/2022
(Continued)

OTHER PUBLICATIONS

Extended European Search Report received in corresponding Application No. EP 22819406.4, dated May 22, 2025, 16 pages.
(Continued)

*Primary Examiner* — Robert J Lopata
(74) *Attorney, Agent, or Firm* — Dority & Manning, P.A.

(57) ABSTRACT

Provided in the present application are a data transmission method, a user equipment, a service node and a storage medium. The method comprises: receiving transmission configuration information; and transmitting data according to the transmission configuration information.

19 Claims, 5 Drawing Sheets

(51) Int. Cl.
*H04W 24/10* (2009.01)
*H04W 76/20* (2018.01)
*H04W 92/18* (2009.01)

(58) Field of Classification Search
CPC ..... H04W 40/34; H04W 76/11; H04W 76/14; H04W 76/20; H04W 8/005; H04W 8/24; H04W 88/04; H04W 92/10; H04W 92/18
USPC .......................................................... 370/329
See application file for complete search history.

(56) References Cited

U.S. PATENT DOCUMENTS

| | | | | |
|---|---|---|---|---|
| 2017/0295567 | A1 | 10/2017 | Chen et al. | |
| 2019/0387446 | A1* | 12/2019 | Xu | H04W 36/0061 |
| 2020/0092685 | A1* | 3/2020 | Fehrenbach | H04W 72/23 |
| 2020/0107218 | A1* | 4/2020 | Wang | H04W 36/18 |
| 2021/0051602 | A1* | 2/2021 | Bai | H04W 52/248 |
| 2021/0168814 | A1* | 6/2021 | Chen | H04W 72/02 |
| 2022/0304083 | A1* | 9/2022 | Xu | H04W 76/14 |
| 2023/0013067 | A1* | 1/2023 | Liu | H04W 28/24 |
| 2023/0074899 | A1* | 3/2023 | Wang | H04W 40/34 |
| 2023/0156688 | A1* | 5/2023 | Kuang | H04W 72/1263 370/329 |
| 2024/0048948 | A1* | 2/2024 | Kang | H04W 40/246 |
| 2024/0057016 | A1* | 2/2024 | Bao | H04W 64/00 |
| 2024/0224109 | A1* | 7/2024 | Kang | H04W 72/02 |

FOREIGN PATENT DOCUMENTS

| | | | |
|---|---|---|---|
| WO | WO2019/061194 | A1 | 4/2019 |
| WO | WO 2021/098804 | A1 | 5/2021 |

OTHER PUBLICATIONS

PCT international Search Report and Written Opinion (with English translation) for corresponding PCT Application No. PCT/CN2022/096114, mailed Aug. 11, 2022, 15 pages.
CATT, "NR Sidelink UP Protocol Stack and Functions", 3GPP TSG-RAN WG2 Meeting #104, R2-1816892, Spokane, USA, Nov. 12-16, 2018.
Korean Office Action (with English translation) for corresponding Application No. 10-2024-7000392, dated May 19, 2026, 16 pages.

* cited by examiner

DATA TRANSMISSION METHOD, USER EQUIPMENT, SERVICE NODE AND STORAGE MEDIUM

CROSS-REFERENCE TO RELATED APPLICATION(S)

This application is a national phase entry under 35 U.S.C. 371 of International Patent Application No. PCT/CN2022/096114 filed on May 31, 2022, the International Patent Application is filed based on Chinese Patent Application with the application No. 202110633948.0, filed on Jun. 7, 2021, and claims priority to the Chinese Patent Application, the entire contents of the International Patent Application and the Chinese Patent Application are incorporated herein by reference.

TECHNICAL FIELD

The present disclosure relates to the technical field of wireless communication, and for example, relates to a data transmission method, a user equipment, a service node, and a storage medium.

BACKGROUND

With the development of wireless multimedia services, there is an increasing demand for a high data rate and user experience from people, which puts forward higher requirements on the system capacity and coverage of a traditional cellular network. In addition, application scenarios such as public safety, social network, proximity data sharing, and local advertising, have led to an increasing demand for people to understand and communicate with people or things nearby (Proximity Services). The traditional cellular network centered on a base station has an obvious limitation in terms of supporting the high data rate and proximity services, and under this demand background, a device-to-device (D2D) technology has emerged. The D2D technology may work in a licensed frequency band or unlicensed frequency band, and allows multiple user equipments (UE) that support a D2D functionality to perform direct discovery or direct communication with or without network infrastructure. The following several UE local transmission paths may replace traditional transmission paths via a core network: a single-hop or multi-hop UE-to-UE relay, a data relay across a centralized unit (CU), a data relay within a same distributed unit (DU), a data relay across DUs within a same centralized unit (CU), and the like. Currently, the transmission paths between UEs are often predetermined before data transmission, and cannot be decided comprehensively according to an actual situation, which has low flexibility and further, affects communication efficiency.

SUMMARY

The present disclosure provides a data transmission method, a user equipment, a service node, and a storage medium, so as to improve the flexibility of data transmission of the UE.

The embodiments of the present disclosure provide a data transmission method, including:

receiving transmission configuration information; and transmitting data according to the transmission configuration information.

The embodiments of the present disclosure further provide a data transmission method, including:

receiving proximity information about a destination UE; and sending transmission configuration information according to the proximity information.

The embodiments of the present disclosure further provide a data transmission method, including:

sending sidelink (SL) forwarding request information; and receiving SL forwarding response information.

The embodiments of the present disclosure further provide a data transmission method, including:

receiving local transmission information of a UE; and sending local transmission acknowledgment information to a core network.

The embodiments of the present disclosure further provide a user equipment, including: a memory, a processor, and a computer program stored on the memory and runnable on the processor, where the processor, upon executing the computer program, implements the above-described data transmission methods.

The embodiments of the present disclosure further provide a service node, including: a memory, a processor, and a computer program stored on the memory and runnable on the processor, where the processor, upon executing the computer program, implements the above-described data transmission methods.

The embodiments of the present disclosure further provide a computer readable storage medium, having stored a computer program thereon, where the computer program, upon being executed by a processor, implements the above-described data transmission methods.

DETAILED DESCRIPTION

Figure 1:
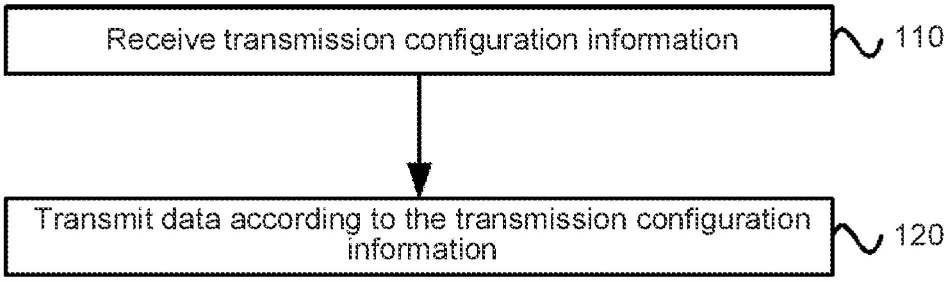
FIG. 1 is a flow chart of a data transmission method provided by an embodiment.

The present disclosure is described below in conjunction with the drawings and the embodiments. It may be understood that the specific embodiments described herein are only used to explain the present disclosure, rather than limiting the present disclosure. It should be noted that embodiments and features in the embodiments in the present disclosure may be combined with each other arbitrarily without conflict. It also should be noted that, for ease of description, only parts but not the entire structure related to the present disclosure are shown in the drawings.

In the embodiments of the present disclosure, a data transmission method is provided that may be applied to a UE (which, for example, may refer to a source UE). FIG. 1 is a flow chart of a data transmission method provided by an embodiment. As shown in FIG. 1, the method includes step 110 and step 120.

In step 110, transmission configuration information is received.

In step 120, data is transmitted according to the transmission configuration information.

In this embodiment, the transmission configuration information may be configured and sent by a service node, the service node may be a base station, an integrated access backhaul (IAB) node, a DU, and a CU, etc., the transmission configuration information includes a transmission path and/or a radio bearer, etc., configured by the service node for a UE, and the UE may transmit data using the corresponding radio bearer on the corresponding path according to the transmission configuration information. And the service node may use proximity information reported by the UE or information indicated by a core network to identify a relative position between UEs, a serving cell, an interface state of a DU or a CU, etc., analyze a potentially possible transmission path, consider a policy, a channel state, load and other factors comprehensively, and configure the most suitable transmission path for the data transmission between UEs in a UE node pair, thereby performing the corresponding transmission, ensuring to arrive most efficiently, and improving flexibility of data transmission between the UEs.

It should be noted that, currently, the short-range communication corresponding to device-to-device communication may be applied in the fields of smart cars, smart terminals, smart homes, and smart manufacturing. In these short-range communication systems, nodes within a system are distinguished into a managing node (G node) and a managed node (T node). In specific application scenarios, a single G node manages a certain number of T nodes, and the G node is connected to these T nodes to jointly complete a specific communication function. The single G node and the T nodes connected thereto form a communication domain together. Taking a smart car scenario as an example, a cockpit domain controller (CDC) may act as a G node, various devices for vehicle (e.g., a microphone, a speaker, etc.) act as T nodes, and the cockpit domain controller and the devices for vehicle jointly complete a cockpit entertainment function. In this case, the CDC and the devices for vehicle form a communication domain, and when a mobile phone is connected to the CDC, the mobile phone may also act as a T node within the communication domain. In a smart car environment, the mobile phone may also act as a G node to connect to a wearable device, and at this time, the mobile phone and the wearable device form another communication domain. In a smart home scenario, a TV and a down-hanging audio device form a communication domain, a mobile phone and a headset form another communication domain, and the two communication domains may be distinguished as an advanced communication domain and a general communication domain, and resources are coordinated by the advanced communication domain, so as to implement coordinated coexistence between multiple domains.

For the embodiments of the present disclosure, the UEs may correspond to the T nodes in the above scenarios, the service node may correspond to the G node in the above scenarios, and a mechanism for forwarding short-range communication data by the service node for the UE mentioned in the embodiments of the present disclosure, such as a bearer configuration, a path configuration, and data transmission, may be applied to the G node to forward the communication data between T nodes for the T nodes.

It should be noted that in the embodiments of the present disclosure, a UE that is not explicitly stated as a source UE or a destination UE may refer to a source UE and/or a destination UE.

In an embodiment, the method further includes step 100: sending proximity information of a destination UE.

In this embodiment, before receiving the transmission configuration information, a source UE may discover a neighboring destination UE and report proximity information about the destination UE to the service node, so as to enable the service node to make a comprehensive decision.

In an embodiment, the proximity information includes at least one of the following information: an identity (ID) of a source UE, an identity of a destination UE, a transmission type (Cast Type), an application identity (APP ID) of the source UE, an application identity of the destination UE, a serving cell identity of the destination UE, a service node identity of the destination UE, a link state between the source UE and the destination UE, quality of service (QOS) of a data flow between the source UE and the destination UE, a hop count between the source UE and the destination UE, and a node identity of a relay node; where the link state includes at least one of: a link measurement result, a link load, an SL resource utilization rate.

In an embodiment, the transmission configuration information includes bearer configuration information and/or path configuration information.

In an embodiment, the bearer configuration information includes at least one of the following information:

a Uu radio link control (RLC) protocol channel configuration; a Uu RLC channel identity; a Uu logical channel configuration; service data adaptation protocol (SDAP) configuration corresponding to a sidelink radio bearer (SL RB); a packet data convergence protocol (PDCP) configuration corresponding to an SL RB; and mapping information between an SL RB and a Uu RLC channel.

In an embodiment, the bearer configuration information includes at least one of the following information:

SDAP configuration corresponding to an SL RB, PDCP configuration corresponding to an SL RB, PC5 RLC channel configuration, and PC5 logical channel configuration.

In an embodiment, the bearer configuration information includes mapping information between an information type and a Uu RLC channel; where the information type includes at least one of: discovery information (information that the source UE requests to discover the destination UE or triggers a proximity discovery process), a PC5-S, PC5 radio resource control (RRC) information, an SL signaling radio bearer (SRB) identity, and an SL data radio bearer (DRB) identity.

In an embodiment, the path configuration information includes one of the following information: a Uu transmission path; an SL transmission path; a Uu transmission path, and an SL transmission path.

In an embodiment, step 120 includes:

in response to the transmission configuration information including a Uu transmission path, or including Uu RLC channel configuration and an SL SRB associated with a Uu RLC channel, or including Uu RLC channel configuration and mapping information between an SL RB and a Uu RLC channel, transmitting corresponding SL RB data through a Uu interface;

in response to the transmission configuration information including an SL transmission path, or including at least one of SDAP configuration corresponding to an SL RB, PDCP configuration corresponding to an SL RB, PC5 RLC channel configuration and PC5 logical channel configuration, transmit the corresponding SL RB data through a PC5 interface;

in response to the transmission configuration information including the SL transmission path and the Uu transmission path, or including Uu RLC channel configuration corresponding to an SL RB and PC5 RLC channel configuration, transmitting the corresponding SL RB data through at least one of the Uu interface and the PC5 interface.

In an embodiment, the transmission configuration information further includes at least one of: a data duplication indication, a data separation transmission indication, a data split threshold, a data split ratio, a primary path indication, a secondary path indication, a path switching indication; where the path switching indication includes at least one of: an identity of a source UE, an identity of a destination UE, an SL RB identity, and path indication.

In this embodiment, in a case where the source UE may transmit the SL RB data through the Uu interface and PC5 interface, the SL RB data may be transmitted on the two interfaces by means of data duplication or data separation.

In an embodiment, step 120 includes: transmitting corresponding SL RB data with the destination UE through a Uu interface and a PC5 interface by means of data duplication or data split.

In an embodiment, the method further includes step 10: sending first discovery information or SL signaling or SL data through a PC5 interface.

In this embodiment, the source UE may send first discovery information or SL signaling or SL data through the PC5 interface, so as to discover a neighboring destination UE, where the first discovery information may be sent directly to the destination UE or may be forwarded to the destination UE via the relay UE, but for all are transmitted through the PC5 interface.

In an embodiment, the method further includes step 12: receiving, through a PC5 interface, second discovery information or SL signaling or SL data sent by a destination UE or forwarded by a relay UE;

where the second discovery information includes at least one of: an application layer identity of the destination UE, a service node identity of the destination UE, a serving cell identity, a resident cell identity, maximum hop count information, transmitted hop count information, and a node identity of a relay node.

In this embodiment, the source UE may receive second discovery information or SL signaling or SL data through the PC5 interface to be discovered by a neighboring destination UE, where the second discovery information may be received directly from the destination UE or may be forwarded by a relay UE or a service node.

In an embodiment, the method further includes step 14: sending local transmission capability information or transmission indication information, where the local transmission capability information or the transmission indication information is used to indicate or request a service node to transmit the discovery information or the SL signaling or the SL data through a Uu interface.

In this embodiment, the source UE may indicate or request the service node to forward discovery information or SL signaling or SL data to other UEs through the Uu interface, and on this basis, the service node may assist the source UE in discovering a neighboring destination UE.

In an embodiment, discovery information or SL signaling or SL data is forwarded by a service node through a Uu interface by means of unicast or broadcast or multicast.

In an embodiment, the discovery information or the SL signaling or the SL data forwarded through the Uu interface carries an identity of a source UE, an identity of a destination UE, and/or an SL RB identity.

In an embodiment, in a case where the discovery information or the SL signaling or the SL data is forwarded by the service node by means of multicast broadcast service (MBS) broadcast or multicast, the service node transmits MBS broadcasting or multicasting configuration of the discovery information or the SL signaling or the SL data by a multicast control channel (MCCH) or a specific signaling;

where the MBS broadcasting or multicasting configuration includes at least one of: a group-radio network temporary identity (G-RNTI) for broadcasting the SL signaling or the SL data, an SL information type, and multicast traffic channel (MTCH) scheduling information;

where the SL information type includes at least one of: an SL traffic type, an SL SRB, SL DRB, PC5-S, and PC5-RRC;

the MTCH scheduling information includes at least one of: an on-line duration after a UE is woken up within a discontinuous reception (DRX) cycle, a duration to remain active after each successful decoding of a physical downlink control channel (PDCCH) after being woken up, a scheduling cycle, and a scheduling offset.

In an embodiment, the method further includes step 16: receiving, through a Uu interface, discovery information or SL signaling or SL data sent by a destination UE and forwarded by the service node, the discovery information or the SL signaling or the SL data carries an identity of a source UE, an identity of a destination UE, and/or an SL RB identity.

In this embodiment, the source UE may receive the discovery information or the SL signaling or the SL data from the destination UE, forwarded by the service node through the Uu interface, and on this basis, the service node may assist the source UE to be discovered by a neighboring destination UE.

In an embodiment, in response to a known UE associated with a destination identity, the service node sends a data packet including the discovery information or the SL data or the SL signaling to the UE associated with the destination identity by means of unicast; where the UE associated with the destination identity includes at least one of: a UE corresponding to the destination identity, and/or a UE interested in receiving the destination identity.

In this embodiment, the destination identity may be a destination UE ID, a serving cell ID of the destination UE, an application ID of the destination UE, etc.

In an embodiment, the method further includes step 18: sending at least one of the following to a service node:

a UE identity assigned by a core network (Next Generation Core, NGC), a destination identity corresponding to an interested traffic type, and a transmission type corresponding to a destination identity.

In this embodiment, the source UE may send the above information to the service node, and on this basis, the service node may assist the source UE to discover a neighboring destination UE.

In an embodiment, the method further includes step 112: sending a service node forwarding SL data indication to a destination UE.

In this embodiment, if the transmission configuration information indicates the source UE to transmit SL data with the destination UE by the service node, then the source UE may send the service node forwarding SL data indication to the destination UE, and on this basis, the destination UE is prepared to receive the SL data forwarded by the service node.

In an embodiment, the method further includes step 114: in response to the destination UE being in an idle or inactive state, entering, by the destination UE, an RRC connected state after receiving the service node forwarding SL data indication.

In this embodiment, the destination UE, which is in an idle or inactive state, enters the RRC connected state after receiving the service node forwarding SL data indication, thereby completing preparation for receiving the SL data forwarded by the service node.

In an embodiment, the method further includes step 1000: receiving a local transmission indication information sent by a network element of a core network, where the local transmission indication information is used to indicate or request a service node to transmit discovery information or SL signaling or SL data through a Uu interface; where the local transmission indication information includes at least one of: a service node forwarding request or indication, an identity of a source UE, an identity of a destination UE, a service node identity of the source UE, a service node identity of the destination UE, a serving cell identity of the source UE, a serving cell identity of the destination UE, and QoS flow information; where the QoS flow information includes at least one of: a QoS flow identity (QFI), a QoS parameter. On this basis, the UE may determine whether the service node can forward the discovery information or the SL signaling or the SL data by receiving the local transmission indication information.

In an embodiment, the transmission configuration information is sent by a service node; the service node includes a base station, a DU, a centralized unit (CU), or an IAB node.

Figure 2:
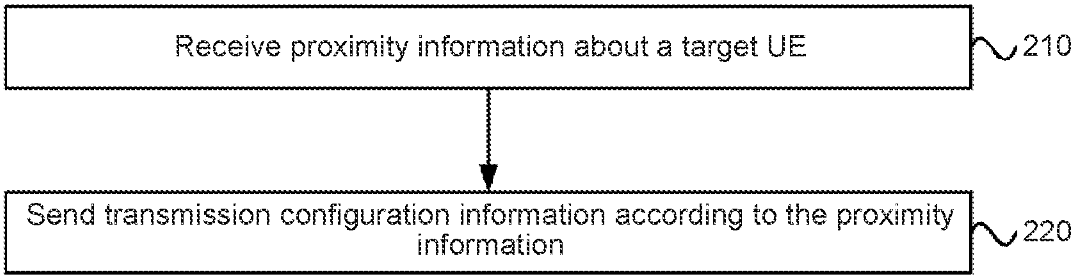
FIG. 2 is a flow chart of a data transmission method provided by another embodiment.

In the embodiments of the present disclosure, a data transmission method is further provided, which can be applied to a service node. FIG. 2 is a flow chart of a data transmission method provided by another embodiment. As shown in FIG. 2, the method includes step 210 and step 220. It should be noted that for operations performed by the service node in this embodiment, technical details not exhaustively described in this embodiment may be found in any of the above embodiments.

In step 210, proximity information about a destination UE is received.

In step 220, transmission configuration information is sent according to the proximity information.

In this embodiment, the service node may send the corresponding transmission configuration information to the source UE and the destination UE by receiving the proximity information about the destination UE. Specifically, the service node may use the proximity information reported by the UE or information indicated by the core network to identify a relative position between UEs, a serving cell, an interface state of a DU or a CU, etc., analyze a potentially possible transmission path, comprehensively consider a policy, a channel state, load and other factors, and configure the most suitable transmission path for the data transmission between UEs in a UE node pair, thereby performing the corresponding transmission, so as to ensure to arrive most efficiently, and improve the flexibility of data transmission between UEs.

In an embodiment, the proximity information is sent by a source UE, or sent by a network element of a core network.

In this embodiment, the proximity information may be reported to the service node after the source UE discovers the destination UE, or may be sent to the service node by the core network after discovering the source UE and the destination UE.

In an embodiment, the method further includes step 200: receiving discovery information or SL signaling or SL data, the discovery information or the SL signaling or the SL data carries an identity of a source UE, an identity of a destination UE, and/or an SL RB identity.

In this embodiment, the service node may assist the source UE to discover a neighboring destination UE by receiving the discovery information or the SL signaling or the SL data sent by the source UE.

In an embodiment, the method further includes step 202: receiving local transmission capability information or transmission indication information, where the local transmission capability information or the transmission indication information is used to indicate or request a service node to transmit the discovery information or the SL signaling or the SL data through a Uu interface.

In this embodiment, the service node may transmit the discovery information or the SL signaling or the SL data through the Uu interface according to the local transmission capability information or transmission indication information of the source UE, to assist the source UE to discover a neighboring destination UE.

In an embodiment, the method further includes step 204: forwarding the discovery information or the SL signaling or the SL data through the Uu interface by means of unicast or broadcast or multicast.

In this embodiment, the service node may forward the discovery information or the SL signaling or the SL data through the Uu interface, to assist the source UE to discover a neighboring destination UE.

In an embodiment, the method further includes step 206: in a case where the discovery information or the SL signaling or the SL data is forwarded by the service node by means of MBS broadcast or multicast, transmitting MBS broadcasting or multicasting configuration of the SL signaling or the SL data via an MCCH or a specific signaling; where the MBS broadcasting or multicasting configuration includes at least one of: a G-RNTI, an SL information type, and MTCH scheduling information; where the SL information type includes at least one of: an SL traffic type, an SL SRB, SL DRB, PC5-S, and PC5-RRC; the MTCH scheduling information includes at least one of: an on-line duration after a UE is woken up within a DRX cycle, a duration to remain active after each successful decoding of a PDCCH after being woken up, a scheduling cycle, and a scheduling offset.

In this embodiment, before forwarding the discovery information or the SL signaling or the SL data by means of MBS broadcast or multicast, the service node may transmit the MBS broadcasting or multicasting configuration of the SL signaling or the SL data through the MCCH or the specific signaling, so that the UE is prepared to receive the forwarded discovery information or SL signaling or SL data.

In an embodiment, in response to a known UE associated with a destination identity, the method further includes step 205: sending a data packet including the discovery information or the SL data or the SL signaling to the UE associated with the destination identity by means of unicast; where the UE associated with the destination identity includes at least one of: a UE corresponding to the destination identity, and/or a UE interested in receiving the destination identity.

In this embodiment, before forwarding the discovery information or the SL signaling or the SL data, the service node may determine whether to be able to identify the destination UE according to the destination identity, and if so, then the service node sends the data packet containing the discovery information or the SL data or the SL signaling to the UE associated with the destination identity by means of unicast.

Figure 3:
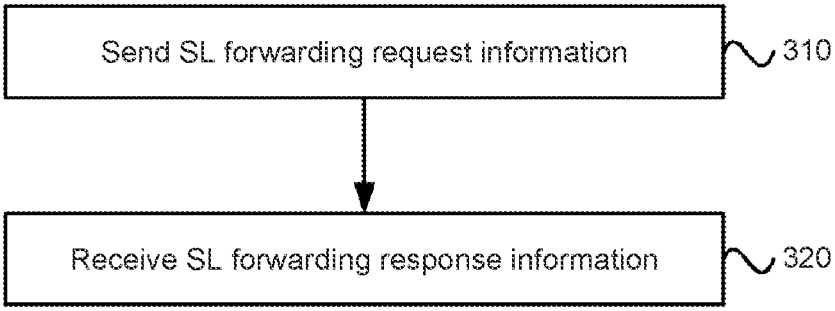
FIG. 3 is a flow chart of a data transmission method provided by a further embodiment.

In the embodiments of the present disclosure, a data transmission method is further provided, which can be applied to a service node, and can be, for example, a service node serving a source UE. FIG. 3 is a flow chart of a data transmission method provided by a further embodiment. As shown in FIG. 3, the method includes step 310 and step 320. It should be noted that for operations performed by the service node in this embodiment, technical details not exhaustively described in this embodiment may be found in any of the above embodiments.

In step 310, SL forwarding request information is sent.

In step 320, SL forwarding response information is received.

In this embodiment, a service node of a source UE may send the SL forwarding request information to a service node of a destination UE, and receive the SL forwarding response information sent by the service node of the destination UE, thereby establishing an SL forwarding tunnel to implement the SL data transmission between UEs across the service nodes, and further, improving flexibility of the data transmission between the UEs.

In an embodiment, the SL forwarding request information includes at least one of: an SL sending request, an SL receiving request, first SL forwarding user-plane transport layer information, QoS information, an SL RB identity, PC5-S, PC5-RRC, PC5-D, an identity of a source UE, an identity of a destination UE or a destination group identity or a destination broadcast identity, and a unicast or multicast indication; where the first SL forwarding user-plane transport layer information includes general packet radio service (GPRS) tunneling protocol information; the QoS information includes at least one of: a PC5 quality indication (PQI), an RLC mode, a QoS parameter of an SL RB, a QoS flow identity mapped to an SL RB, and a QoS parameter of a QoS flow.

In an embodiment, the SL forwarding response information includes at least one of: second SL forwarding user-plane transport layer information, an SL RB identity of acceptance and/or non-acceptance, a QFI of acceptance and/or non-acceptance, PC5-S, PC5-RRC, PC5-D, an identity of a source UE, an identity of a destination UE or a destination group identity or a destination broadcast identity; where the second SL forwarding user-plane transport layer information includes GPRS tunneling protocol information of a destination service node.

In this embodiment, the destination service node is a service node serving the destination UE.

In an embodiment, the method further includes:

- step 330: determining a destination service node of discovery information or SL data or SL signaling that is to be forwarded according to a destination identity contained in the discovery information or the SL data or the SL signaling, and/or, determining an SL forwarding tunnel of SL data or SL signaling with the destination service node according to an SL RB identity contained in discovery information or SL data or SL signaling that is to be forwarded;
- step 340: delivering the discovery information or the SL data or the SL signaling that is to be forwarded to the SL forwarding tunnel, and forwarding the discovery information or the SL data or the SL signaling to the destination service node.

In an embodiment, the discovery information or the SL information or the SL signaling is forwarded by the destination service node to a destination UE, or is broadcast in each serving cell of the destination service node.

In this embodiment, the SL forwarding request information is sent by a first service node and the SL forwarding response information is sent by a second service node;

- where the first service node is a first base station, a first distributed unit, a first centralized unit, a first IAB node, or a third distributed unit;
- correspondingly, the second service node is a second base station, a second distributed unit, a second centralized unit, a second IAB node, or a third centralized unit.

In this embodiment, the interaction of the SL forwarding request information and the SL forwarding response information may be between different base stations, between different distributed units, between different centralized units, between different IAB nodes, or between a distributed unit and a centralized unit.

Figure 4:
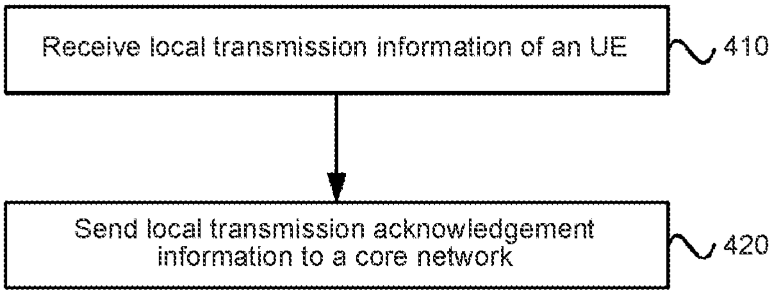
FIG. 4 is a flow chart of a data transmission method provided by yet another embodiment.

In the embodiments of the present disclosure, a data transmission method is further provided, which can be applied to a service node, and can be, for example, a service node serving a source UE and/or a destination UE. FIG. 4 is a flow chart of a data transmission method provided by yet another embodiment. As shown in FIG. 4, the method includes step 410 and step 420. It should be noted that for operations performed by the service node in this embodiment, technical details not exhaustively described in this embodiment may be found in any of the above embodiments.

In step 410, local transmission information of a UE is received.

In step 420, local transmission acknowledgment information is sent to a core network.

In this embodiment, a service node may receive local transmission information sent by a network element of the core network and send the local transmission acknowledgment information to the core network, thereby with the assistance of the core network, completing proximity discovery and SL data transmission between UEs, and improving flexibility of the data transmission between UEs.

In an embodiment, the method further includes step 430: sending transmission configuration information to the UE.

In this embodiment, the service node selects a suitable transmission path for the source UE and the destination UE according to the local transmission information of the UE and sends the transmission configuration information to the UE.

In an embodiment, the local transmission information is sent by a network element of the core network; the local transmission information includes at least one of: a service node forwarding discovery information or SL signaling or SL data authorization indication of the UE, a service node forwarding request or indication, an identity of a source UE, an identity of a destination UE, a service node identity of the source UE, a service node identity of the destination UE, a serving cell identity of the source UE, a serving cell identity of the destination UE, and QoS flow information; where the QoS flow information includes at least one of: a QFI, a QoS parameter.

In an embodiment, the local transmission acknowledgment information includes at least one of: a service node local forwarding response, QoS flow information of a source UE that is forwardable by a service node, QoS flow information of the source UE that is not forwardable by the service node, and a reason for being not forwardable by the service node.

In an embodiment, SL RB data is transmitted by a source UE or a destination UE through a Uu interface RLC channel.

In an embodiment, the method further includes step 440: in response to receiving service node forwarding authorization indication of the UE, forwarding SL signaling or SL data of the UE.

In this embodiment, the service node forwards data between UEs only if the UEs authorize the service node to forward.

In an embodiment, PC5-S and/or PC5-RRC are transmitted by the source UE and the destination UE through a fixed-configured or default-configured Uu interface RLC channel.

The data transmission methods are explained below with some examples.

Example 1

In this example, a source UE and a destination UE wish to transmit data. The source UE may acquire one or more of the following information by an application server or a policy control function (PCF), or in a pre-configured way: PC5 communication authorization information of each public land mobile network (PLMN), radio access type (RAT) information of PC5 communication authorized by the UE, an air interface parameter corresponding to each PC5 RAT and under a geographic area, mapping information of a traffic type to a PC5 RAT and a corresponding transmission profile (Tx Profile), a traffic type of the geographic area and a corresponding timer (the timer is used to indicate an updating interval of a long term evolution layer 2 (L2) source device identity assigned by the UE itself (i.e., an updating interval of the assigned Source L2 ID)), mapping of a traffic type to a V2X (Vehicle to everything) frequency and a geographic area, mapping of a traffic type to a communication mode (e.g., broadcast, multicast, or unicast), mapping of a traffic type to an identity of a destination UE (i.e., Destination L2 ID) corresponding to broadcast or multicast, mapping of a traffic type to a default Destination L2 ID corresponding to unicast connection established initial signaling, mapping of a traffic type to a PC5 QoS parameter (e.g., PQI, maximum flow bit rate (MFBR), guaranteed flow bit rate (GFBR), etc.), an access stratum (AS) layer configuration (e.g., mapping of a PC5 QoS configuration to a radio bearer), and valid periods of the various information or parameters described above, etc.

If the application layer of the source UE wishes to initiate PC5 unicast for data transmission of a certain traffic type, then the source UE first considers whether the existing PC5 unicast link may be reused (which may be determined according to whether the destination UE application layer identity (also referred to as a peer UE application layer ID) and the network layer protocol are the same), and if there is a reusable PC5 unicast link, it may consider to modify the existing PC5 unicast link, and add the service type, for data transmission between the source UE and the destination UE; otherwise, the source UE will trigger to establish a new PC5 unicast link.

If the source UE already knows the L2 ID of the destination UE before establishing the PC5 unicast link with the destination UE, then the source UE may use the L2 ID of the destination UE as the Destination L2 ID in the initial PC5 unicast link establishing signaling, and transmit the initial PC5 unicast link establishing signaling by means of unicast, otherwise the source UE uses the default broadcast Destination L2 ID associated with the V2X traffic type corresponding to the PC5 unicast link establishing and transmits the initial PC5 unicast link establishing signaling by means of broadcast.

Figure 5:
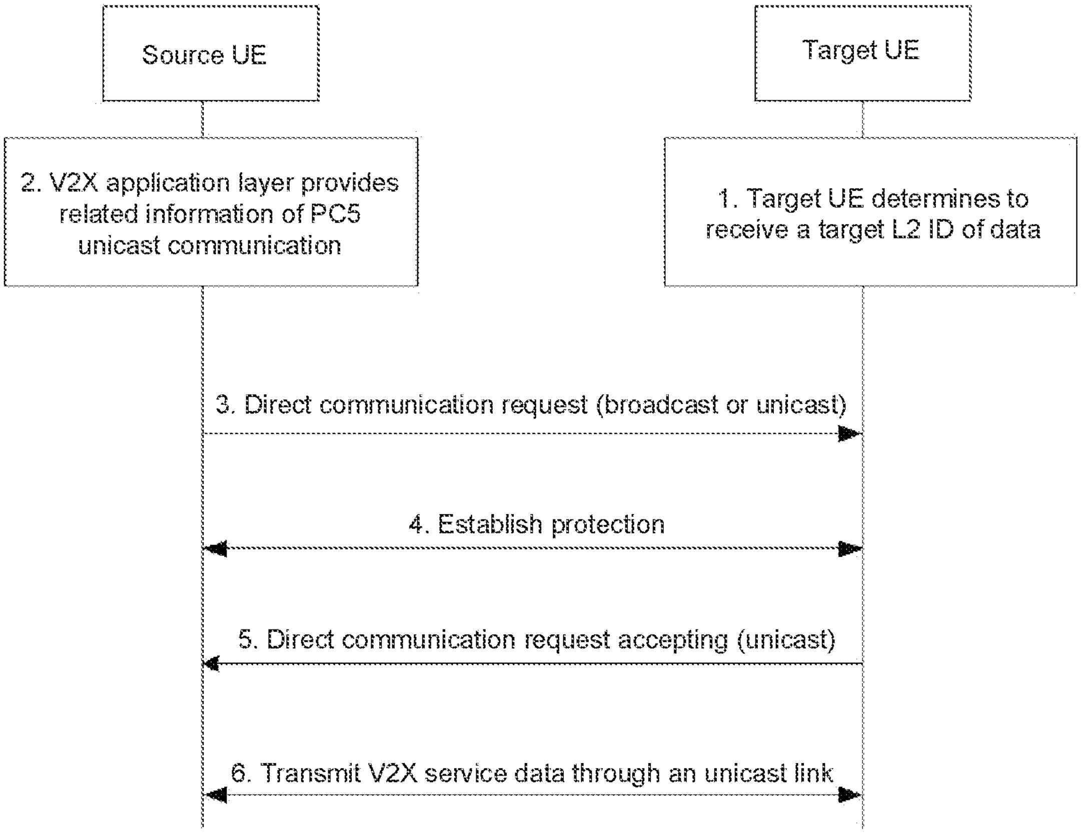
FIG. 5 is a schematic diagram of establishing a PC5 unicast connection between user equipments provided by an embodiment.

FIG. 5 is a schematic diagram of establishing a PC5 unicast connection between user equipments provided by an embodiment. As shown in FIG. 5, an application layer of the source UE provides application layer information of PC5 unicast communication. The application layer information includes a traffic type and an application layer ID of the source UE. The application layer information may also include an application layer ID of the destination UE. The application layer of the source UE further provides an application requirement of the unicast communication, and on this basis, the source UE or the destination UE may determine a PC5 QoS parameter and a packet flow identifier (PFI), correspondingly.

Correspondingly, the destination UE needs to determine a destination L2 ID corresponding to the PC5 unicast link establishing signaling reception. The destination UE may acquire the destination L2 ID corresponding to the PC5 unicast link establishing signaling by the following ways: 1) the destination L2 ID can be discovered in the process of establishing the PC5 unicast link between the source UE and the destination UE; 2) the destination L2 ID is perceived according to the previous V2X communication (e.g., the existing or previously established unicast link corresponding to the same application layer ID); 3) the destination L2 ID is acquired from application layer traffic announcement information.

Assuming that the source UE initiates a new PC5 unicast link establishment, then the source UE sends a direct communication request information, and the information may contain an application layer ID of the source UE, an application layer ID of the destination UE (optional), a traffic type, and security information. The source UE may use a Source L2 ID assigned by itself, in the process of transmitting the direct communication request information.

Next, security protection is established between the source UE and the destination UE, and when the security protection is enabled, the source UE may send IP (Internet Protocol) address configuration information and/or PC5 QoS flow information to the destination UE. For example, each PC5 QoS flow may contain a PFI, a corresponding QoS parameter (such as PQI, MFBR, GFBR, etc.), and a corresponding traffic type. Correspondingly, if the destination UE finds that it matches the application layer ID contained in the direct communication request information, or is interested in the traffic contained in the direct communication request information, then the destination UE may send direct communication acceptance information to the source UE, and the direct communication acceptance information may contain related information of the source user, such as IP address configuration information, an application layer ID of the source UE, PC5 QoS flow information requested by the destination UE, for example, each PC5 QoS flow may contain a PFI, a corresponding QoS parameter (such as PQI, MFBR, GFBR, etc.), and a corresponding traffic type.

After the PC5 unicast link is established, the L2 ID node pair is used for subsequent PC5-S signaling and traffic data transmission between UEs (in this example, the UE may be the source UE and/or the destination UE, in the case where the source UE or the destination UE is not specified). For each PC5 unicast link, the UE itself assigns a PC5 link identity PLI for uniquely identifying a PC5 unicast link. Each PC5 unicast link is associated with a unicast link configuration, which includes an application layer ID and an L2 ID of the source UE, an application layer ID and an L2 ID of the destination UE, and PC5 QoS flow information. The UE maintains a mapping relationship between the application layer ID for the PC5 unicast link and its own source L2 ID. When the source L2 ID of the UE changes, the V2X application would not be affected. On the contrary, if the application layer ID changes, then the corresponding source L2 ID of the PC5 unicast link changes correspondingly. After the UE establishes the PC5 unicast link, the UE sends the PC5 link identifier (PLI), the L2 IDs of the source UE and the destination UE, and the corresponding PC5 QoS parameter to the AS layer, so that the AS layer may maintain the PLI and the PC5 unicast link related information.

After the PC5 unicast link is established, data may be transmitted between the source UE and the destination UE, e.g., the source UE may send a data packet, a PLI and/or PFI information corresponding to the data packet, and also optionally, the L2 IDs of the source UE and the destination UE, to the AS layer. After the AS layer of the source UE receives the above QoS information, the configuration of the PC5 RRC is performed continuously between the source UE and the destination UE, following the SL RB configuration in the specific signaling or the system information block (SIB) or the pre-configuration, and interacting the SL DRB configuration with the peer UE by the PC5 RRC message. Specifically, if the SL RB configuration in the specific signaling or the SIB or the pre-configuration includes creating a new SL DRB, the UE creates, according to parameters of the PC5 QoS flow, the corresponding SL DRB, including an SDAP entity (if there is not an SDAP entity yet), a PDCP entity, an RLC entity, configuring a logical channel and assigning an LC (logical channel) ID for the logical channel.

When an RRC reconfiguration sidelink configuration received by source UE and sent by the peer destination UE includes creating a new SL DRB, the source UE may also create the corresponding SL DRB, including the SDAP entity, the PDCP entity, the RLC entity, the logical channel configuration (using the LC ID configured by the peer UE). In addition, if the source UE is in a connected state, and the SL DRB is configured as a bi-directional DRB, and the source UE has not yet obtained a parameter configuration of the bi-directional SL DRB, then the source UE sends the sidelink UE Information to request the related configuration from the base station, for example, the source UE reports a RLC mode and an optional PC5 QoS configuration.

When the SL RB is created, the AS layer of the source UE maps the data packet received from the high layer to the corresponding SL RB, and then assembles the data packet into a MAC (media access control) PDU according to only scheduling and transmits the MAC PDU through the PC5 unicast link.

It should be noted that an application layer ID may be associated with one or more device-to-device applications within the UE. If the UE has multiple application layer IDs, then from the perspective of the peer UE, each application layer ID of the same UE may be treated as an application layer ID of a different UE. One or more traffic types may be involved within a PC5 unicast link, but must be associated to the same application layer ID. For example, a UE A and a UE B have two PC5 unicast links, one of the two PC5 unicast links is between a peer application layer ID 1 of the UE A and an application layer ID 2 of the UE B, and another of the two PC5 unicast links is between a peer application layer ID 3 of the UE A and an application layer ID 4 of the UE B.

When the source UE wishes to communicate with the destination UE, and it is assumed that the source UE has not yet established a PC5 unicast link with the destination UE, then the source UE may carry the application layer ID of the source UE and the application layer ID of the destination UE in a PC5 link establishing request, and then send the PC5 link establishing request in broadcast. If the destination UE receives the PC5 link establishing request, then the destination UE sends a response message to the source UE.

Example 2

Generally, the source UE and the destination UE may discover each other and establish a PC5 unicast link, but in some scenarios (for example, SL resource congestion, or degradation of the quality of the PC5 unicast link between the source UE and the destination UE, etc.), other transmission paths may need to be selected, so that it is necessary to consider a suitable SL data transmission path globally. In this case, a data transmission path planning between UEs may be uniformly managed by a service node, to configure the corresponding route and bearer, so that the data transmission between UEs (in this example, the UE may be the source UE and/or the destination UE, in a case where the source UE or the destination UE is not specified) may meet localized requirements, while the low latency and high efficiency are guaranteed.

For proximity detection between the source UE and the destination UE, the following several scenarios for transmitting discovery information through the PC5 interface for proximity detection, may be considered.

1) PC5 single-hop: after discovering and establishing the PC5 unicast link through the PC5 interface between the source UE and the destination, the source UE may report proximity information to the service node, and the proximity information includes any combination of the following related information of the destination UE: an identity of a source UE, an identity of a destination UE (destination L2 ID), a transmission type (Cast Type), an APP ID of the source UE, an APP ID of the destination UE, a serving cell ID of the destination UE, a service node ID of the destination UE, a link state between the source UE and the destination UE, QoS information of a data flow between the source UE and the destination UE, a hop count between the source UE and the destination UE, and a node identity of a relay node. Herein, the link state between the source UE and the destination UE may further include a link measurement result between the source UE and the destination UE, a load and/or SL resource utilization rate between the source UE and the destination UE. After receiving the above information, the service node of the source UE analyzes which possible paths are between the source UE and the destination UE, to select the most suitable transmission path for the data transmission between the source UE and the destination UE.

Assuming that the service node of the source UE discovers that the source UE and the destination UE are served by a same service node, and the service node discovers that the resource utilization rate when the data transmission between the source UE and the destination UE is forwarded by the service node, is best, then the service node of the source UE may send bearer configuration information and/or path configuration information to the source UE. For example, the bearer configuration information received by the source UE from the service node includes any combination of the following information: Uu RLC channel configuration (which may include a Uu RLC channel ID, a Uu RLC and/or a Uu logical channel configuration), an SL RB ID (which includes an SL SRB ID or an SL DRB ID), SDAP configuration corresponding to an SL DRB, PDCP configuration corresponding to an SL DRB or an SRB. Herein, the Uu RLC channel configuration may be the SL RB data transmission with a specific peer UE, such as SL DRB 3 of the destination UE, i.e., this Uu RLC channel can only transmit data of the SL DRB 3 between the source UE and the destination UE. In this case, the bearer configuration information received by the source UE from the service node contains SL RB information associated with the Uu RLC channel, or Uu RLC channel information associated with the SL RB. Herein, the SL RB may be identified by the source UE, identified by the destination UE, and indicated by the SL RB identity information. The Uu RLC channel may be indicated by the Uu RLC channel ID or the logical channel ID. In addition, the Uu RLC channel configured for the source UE by the service node of the source UE may also be used to transmit data between the source UE and different peer UEs or destination UEs. The SDAP configuration of the SL RB may contain mapping of a QoS flow of the source UE to an SL RB. In an example, the source UE may also receive a configuration of mapping of the SL RB to the Uu RLC channel, indicating which SL RBs can be mapped to which Uu RLC channel.

Additionally, the path configuration information may be a Uu transmission path, an SL transmission path, or information of the Uu transmission path and the SL transmission path. The path configuration information may be indicated implicitly or explicitly. Herein, the implicit configuration may be inferred by the bearer configuration information. For example, the service node only configures the Uu RLC channel for the UE, and configures the SL SRB associated with the Uu RLC channel or configures mapping of the SL RB to the Uu RLC channel, this means that the service node indicates the UE to transmit the corresponding SL RB data with the peer UE by the Uu. For another example, if the service node only configures SDAP configuration, PDCP configuration, an RLC channel configuration and a logical channel configuration corresponding to the SL RB for the UE, where the SDAP/PDCP/RLC/logical channel configurations all correspond to the SL or PC5 interfaces, then this implicitly means that the UE transmits the corresponding SL RB data by the PC5. In an example, if the service node configures both the Uu RLC channel and the PC5 RLC channel for the UE, it implicitly means that the UE may select either the Uu or the PC5 for the SL RB data transmission, or that the UE may perform SL RB data transmission by both the Uu and the PC5.

It should be noted that granularity of the path configuration information may be per UE node pair or per SL RB. If it is per UE node pair, then for a specific source UE and destination UE, all SL RB transmissions between them use the same path. If it is per SL RB, then for a combination of a specific source UE, destination UE, and SL RB ID, the data transmission of the SL RB uses the same path (e.g., Uu, SL, or Uu and SL). It means that within a UE node pair, different SL RBs may use different transmission paths.

The destination UE may receive a similar configuration from the service node. Once the bearer and/or the path of the source UE and the destination UE are configured, the SL data may start to be transmitted through the Uu RLC channel or PC5 RLC channel.

2) PC5 two-hop: a relay UE forwards information between the source UE and the destination UE: the source UE sends first discovery information containing an application layer ID corresponding to the destination UE through the PC5 interface. Assuming that a surrounding UE1 receives the first discovery information and the UE1 has a PC5 information forwarding capability, then the UE1 may further forward the first discovery information, and if the destination UE is near the UE1 and receives the first discovery information containing an application layer ID corresponding to the destination UE, then the destination UE sends second discovery information, which may contain at least one of the following information: an application layer ID of the destination UE, a service node identity of the destination UE, a serving cell identity, a resident cell identity, maximum hop count information, transmitted hop information, and a node identity of a relay node. After the UE1 receives the second discovery information, the UE1 forwards the second discovery information at the PC5 interface, and after the source UE receives the second discovery information, the source UE sends proximity information of the destination UE to the service node, the proximity information contains at least one of the following information: an identity of a source UE, a destination L2 ID, a transmission type (Cast Type), an APP ID of the source UE, an APP ID of the destination UE, a serving cell ID of the destination UE, a service node identity of the destination UE, a link state between the source UE and the destination UE, QoS information of a data flow between the source UE and the destination UE, a hop count between the source UE and the destination UE, a node identity of a relay node. After the service node of the source UE receives the above proximity information, the service node of the source UE analyzes which possible paths are between the source UE and the destination UE, selects the most suitable transmission path for the data transmission between the source UE and the destination UE, and sends the corresponding bearer configuration information and/or path configuration information to the source UE.

3) PC5 multi-hop: the first discovery information sent by the source UE may further also contain maximum allowable forwarding hop count information. When the UE1 around the source UE receives the first discovery information, and the UE1 has the PC5 information forwarding capability, then the UE1 may further forward the first discovery information, and before the UE1 forwards the first discovery information, the UE1 decreases the maximum hop count by 1. Assuming that a UE2 around the UE1 receives the first discovery information, the UE2 may continue to forward the first discovery information, and similarly, the UE2 needs to decrease the maximum hop count information by 1 before forwarding. The first discovery information may continue to be forwarded by neighboring UEs in sequence until the maximum hop count information in the first discovery information is decreased to 0. Assuming that the destination UE is near the UE2 and receives the first discovery information containing the application layer ID of the destination UE, then the destination UE sends second discovery information, which may contain at least one of the following information: an application layer ID of the source UE, an application layer ID of the destination UE, a service node identity, a serving cell identity, a resident cell identity information, maximum hop count information, and transmitted hop number information. The usage of maximum hop count information contained in the second discovery information is similar to that of the maximum hop count information contained in the first discovery information, i.e., the maximum hop count information is decreased by 1 for every relay forwarding node that has been passed through, until the maximum hop count information is decreased to 0, then the second discovery information is received by the source UE, and cannot be forwarded anymore. For the transmitted hop count information, then the destination UE may set the transmitted hop count information in the second discovery information to 1, and when a neighboring UE receives the second discovery information, if it continues to forward, then the transmitted hop number information is added by 1, until the source UE receives the second discovery information. After the source UE receives the second discovery information sent by the destination UE, the source UE may send proximity information of the destination UE to the service node, the proximity information includes at least one of the following information: a destination L2 ID, a serving cell ID, a hop count between the source UE and the destination UE, and QoS information of a data flow between the source UE and the destination UE. After the service node of the source UE receives the above proximity information, the service node of the source UE analyzes which possible paths are between the source UE and the destination UE, selects the most suitable transmission path for data transmission between the source UE and the destination UE, and sends the corresponding bearer and route configuration to the source UE.

In an example, in the process of the first discovery information being forwarded through neighboring relay nodes, each relay node may include its own node identity in the first discovery information, where the node identity may be an L2 ID, or an identity assigned by the network. When the first discovery information arrives at the destination UE, the destination UE may transmit the second discovery information to the relay node by means of unicast, according to a list of node identities of relay nodes carried in the first discovery information, and then the second discovery information is forwarded by the relay nodes in sequence until arriving at the source UE. In this case, the source UE, upon sending the proximity information of the destination UE to the service node, may carry node identities of all relay nodes passing between the source UE and the destination UE.

In an example, it is possible for the service node to, according to a channel state, a data traffic, load condition, etc., dynamically update the path configuration information, for example, switching from an SL transmission path to a Uu transmission path, or switching from a Uu transmission path to an SL transmission path, or switching from a Uu transmission path to a Uu transmission path and an SL transmission path for transmitting simultaneously. For the case of the Uu transmission path and the SL transmission path for transmitting simultaneously, the service node may further configure the UE to transmit data of the corresponding SL RB on both paths by means of data duplication or data split. If the UE is configured by the service node to deliver the data of the SL RB by means of data duplication, then the service node may further send a data duplication indication to the UE, and after the source UE performs SL PDCP encryption on the data packet, delivers the data packet to the Uu RLC channel and the PC5 RLC channel for transmission. After the peer destination UE receives data packets through the Uu RLC channel configured by the service node and the PC5 RLC channel with the source UE, the data packets are uniformly submitted to an SL PDCP entity for the processing of sorting, discarding duplicate packets, etc. If the UE is configured by the service node to deliver the data of the SL RB by means of data split, then the service node may further send to the UE, a data split threshold, a data split ratio, a primary path indication, a secondary path indication and/or a path switching indication, and the like. The path switching indication includes an identity of a source UE, an identity of a destination UE, an SL RB identity, and/or path indication. The UE may transmit the corresponding SL RB data by means of data split according to the information configured by the service node.

Considering the timeliness of the path switching, it may be considered to send the path switching indication by MAC CE (control element) (for example, indicating the path used by the SL RB, through MAC CE), and specifically, the MAC CE may contain any combination of the following information: an identity of a source UE, an identity of a destination UE, an SL RB ID, a path indication, a data duplication or data separation transmission indication. Herein, the path indication may be a Uu, an SL, or a Uu and an SL. Optionally, the corresponding path may be indicated by a bitmap.

Example 3

In addition to transmitting the first discovery information through the PC5 interface between UEs for the UE proximity discovery as described in the above examples, it may be also considered that the UE proximity discovery is assisted by a service node.

Figure 6:
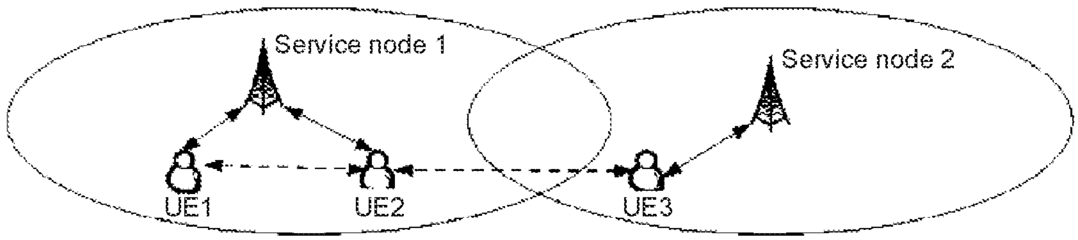
FIG. 6 is a schematic diagram of a service node assisting a UE to perform proximity discovery provided by an embodiment.

FIG. 6 is a schematic diagram of a service node assisting a UE to perform proximity discovery provided by an embodiment. As shown in FIG. 6, assuming that a UE1 (i.e., a source UE) wishes to perform data transmission with a UE2 (i.e., a destination UE), the UE1 may assemble discovery information, and the discovery information may contain any combination of the following information: an application layer ID of the source UE, an application layer ID of the destination UE, a traffic type, security information, and QoS information. This discovery information is forwarded through a service node 1 to the UE2 served by the service node 1.

For example, the UE1 may transmit the discovery information through a Uu RLC channel configured by the service node 1 or transmit the discovery information through a Uu SRB. Before the service node 1 configures the Uu RLC channel for transmitting the discovery information for the UE1, the UE1 may send local transmission capability information (which may also be referred to as transmission indication information) to the service node 1, thereby indicating or requesting the service node 1 to transmit the discovery information or SL signaling or data through the Uu interface.

Figure 7:
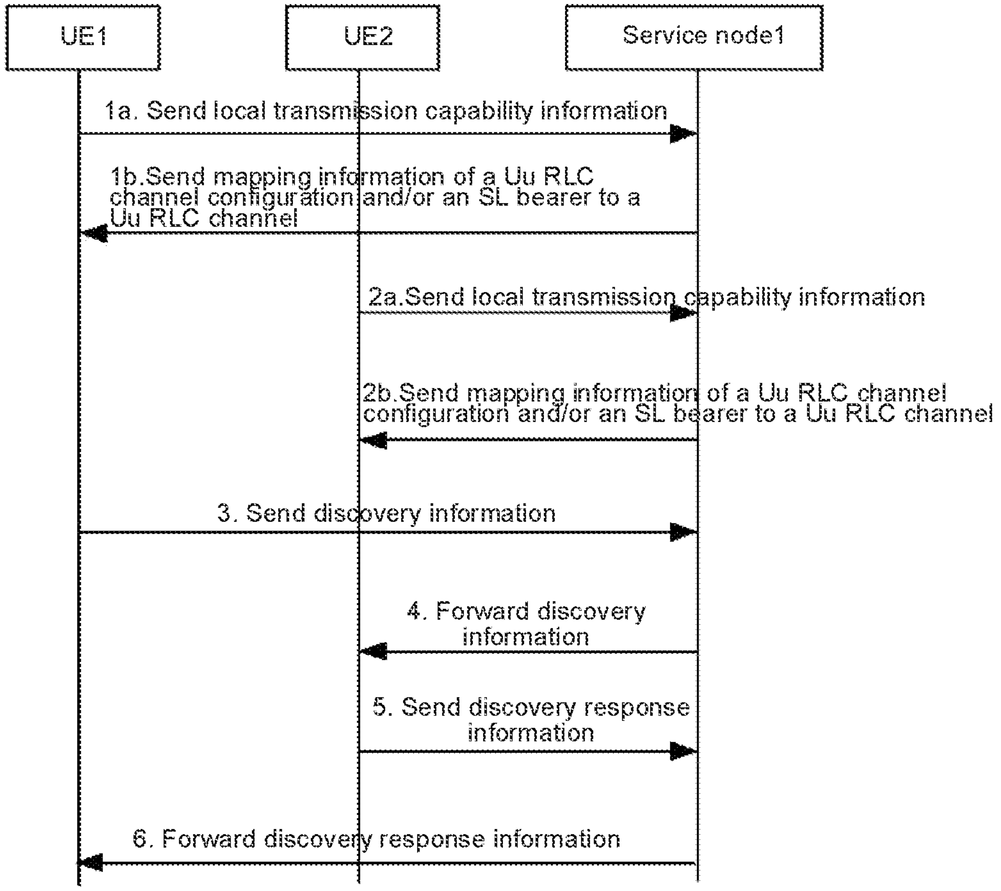
FIG. 7 is a schematic diagram of a service node forwarding discovery information provided by an embodiment.

FIG. 7 is a schematic diagram of a service node forwarding discovery information provided by an embodiment. As shown in FIG. 7, the service node 1, after receiving the local transmission capability information, sends the Uu RLC channel configuration to the UE1. Additionally, the service node 1 may configure a mapping of an information type to a Uu RLC channel, where the information type may be any combination of the following types: discovery information, PC5 connection establishing information, PC5 connection modifying information, PC5 connection releasing information, PC5 keep alive information, a security message, a PC5-S, a PC5-RRC, an SL SRB ID, an SL DRB ID. Similarly, the UE2 may also send the local transmission capability information to the service node 1, thereby indicating or requesting the service node 1 to transmit the discovery information or SL signaling or SL data through the Uu interface. The service node 1, after receiving the local transmission capability information, sends the Uu RLC channel configuration to the UE2. Additionally, the service node 1 may configure a mapping of an information type to a Uu RLC channel, where the information type may be any combination of the following types: discovery information, PC5 connection establishing information, PC5 connection modifying information, PC5 connection releasing information, PC5 keep alive information, a security message, a PC5-S, a PC5-RRC, an SL SRB ID, an SL DRB ID.

The UE1, after completing the Uu RLC channel configuration, sends the discovery information to the service node 1. The discovery information sent by the UE1 may encapsulate an adaptation sub-header, which contains an identity of a source UE, an identity of a destination UE and/or an SL RB identity. The service node 1, after receiving the discovery information, may forward the discovery information through the Uu interface. If the service node 1 knows that the destination UE ID contained in the discovery information corresponds to the UE2, then the service node 1 may send the discovery information to the UE2 by means of unicast; if the service node 1 does not know that the destination UE ID contained in the discovery information corresponds to the UE2, or the UE2 is in an inactive state or an idle state, then the service node 1 may send the discovery information in broadcast. A specific broadcast may be done by defining a new SIB to transmit the discovery information, or by MBS broadcasting or by multicasting transmission. For the way of the MBS broadcasting or multicasting transmission, the service node 1 may configure a G-RNTI for broadcasting SL signaling or SL data for a UE that supports to relay SL data or SL signaling by the service node, or for a UE that requests the service node to relay and forward SL signaling or SL data. In addition, the service node 1 may send MBS broadcasting or multicasting configuration of the SL signaling or SL data to the UE by an MCCH or a specific signaling, where the MBS broadcasting or multicasting configuration may contain any combination of the following information: a G-RNTI, an SL information type. MTCH scheduling information, and the like. Herein, the SL information type may contain any combination of the following information: an SL traffic type, an SL SRB ID, an SL DRB ID, a PC5-S or a PC5-RRC, etc. The MTCH scheduling information may contain an on-line duration after a UE is woken up within a DRX cycle (ondurationtimer), a duration to remain active after each successful decoding of a PDCCH after being awakened (drxInactivitytimer), a scheduling cycle, a scheduling offset, etc.

The UE2 that is interested in receiving the SL signaling or SL data forwarded by the service node 1, receives the discovery information sent by the service node 1. The UE2 discovers that it is interested in the traffic type contained in the discovery information or that the application layer ID of the UE2 corresponds to the application layer ID of the destination UE contained in the discovery information, then the UE2 may send discovery response information through the Uu RLC channel or SRB to the service node 1. After the service node 1 receives the discovery response information, if the service node 1 knows that a destination UE ID contained in the discovery response information corresponds to the UE1, then the service node 1 may send the discovery response information to the UE1 by means of unicast; if the service node 1 does not know that the destination UE ID contained in the discovery response information corresponds to the UE1, then the service node 1 may broadcast the discovery response information. For example, the broadcast may be done by defining a SIB for transmission, or by MBS broadcasting or multicasting transmission. The process of the MBS broadcasting or multicasting is similar to the process of sending the discovery information by the service node as described above.

The UE1 may complete the proximity discovery process with UE2 after receiving the discovery response information sent by the service node 1. The UE1 may report to the service node 1 the discovered information of the UE2, such as at least one of the following information: a source UE ID, a destination UE ID, an application identity (APP ID) of the source UE, an APP ID of the destination UE, a serving cell ID of the destination UE, and QoS information of a data flow between the UE1 and the UE2. The service node 1, after receiving the above information, analyzes which possible paths are between the UE1 and the UE2, selects the most suitable transmission path for the data transmission between the UE1 and the UE2, and sends the corresponding bearer configuration information and/or path configuration information to the UE1 and/or the UE2.

Similarly, a PC5 signaling message, a PC5 discovery message, a PC5 RRC signaling, and PC5 data between UEs may be forwarded by the service node via the above way. The UE adopts unicast when sending the above PC5 related signaling or message or data to the service node, and the service node, when forwarding the PC5 related signaling or message or data in downlink, may choose to transmit by means of broadcast or multicast or unicast at the Uu interface according to a transmission type (Cast Type) of the signaling or data. For example, if the PC5 signaling itself corresponds to the PC5 interface broadcast transmission, then the service node transmits in downlink at the Uu interface by means of broadcast; if the PC5 signaling itself corresponds to a PC5 interface unicast transmission, then the service node transmits in downlink at the Uu interface by means of unicast. To achieve this, when the UE sends the PC5 related signaling or message or data to the service node, the data packet may carry a transmission type of the PC5 related signaling or message or data, an identity of a source UE (source ID) and/or an identity of a destination UE (destination ID). Or the UE, before sending the PC5 related signaling or message or data to the service node, sends the Cast Type corresponding to the destination ID to the service node. The service node, after receiving the Cast Type information corresponding to the data packet containing the PC5 related signaling or message or data, may perform the transmission of the corresponding Cast Type at the Uu interface. In an example, if the service node explicitly knows a UE corresponding to the destination ID, or a UE interested in the traffic type corresponding to the destination ID, then the service node may send the data packet containing the PC5 related signaling or message or data to one or more UEs by means of unicast. It should be noted herein that, the destination ID may be an ID assigned by the UE itself or an ID configured by the service node or NGC for the UE. In order to support the service node to be able to find the corresponding UE according to the destination ID, or the service node to be able to be informed of the UE interested in the traffic type corresponding to the destination ID, the UE may send the L2 ID assigned by itself or the ID assigned by the NGC for the UE, to the serving base station. In addition, the UE may send the destination ID and/or the corresponding Cast Type corresponding to the traffic type that the UE is interested in receiving, to the base station.

Example 4

Example 3 gives that the proximity discovery and/or the data forwarding are performed by this service node between UEs served by a same service node, and the proximity discovery and/or the data forwarding between UEs served by different service nodes may be considered in this example.

For example, as shown in FIG. 6, assuming that a UE2 (i.e., a source UE) wishes to transmit data with a UE3 (i.e., a destination UE), the UE2 assembles direct communication request information, where content contained in the direct communication request information may refer to the above example 1. The UE2 sends the direct communication request information to a service node 1. After the service node 1 receives the direct communication request information, if the destination UE of the direct communication request being served by the service node 1 may be identified by a destination identity contained in the direct communication request information, then the service node 1 may forward the direct communication request information to the UE3; otherwise, the service node 1 sends the direct communication request information in broadcast within each cell range. The specific broadcast transmission may refer to any of the above examples.

As in the scenario shown in FIG. 6, the UE3 is not in a service area of the service node 1 and is served by the service node 2, then service node 1 may send the direct communication request information to the neighboring service node 2 through an Xn interface. For example, one or more Xn GTP (GPRS tunnel protocol)-U tunnels may be established between the service node 1 and the service node 2, for forwarding of SL signaling and/or SL data. It is possible that these Xn GTP-U tunnels are pilot frequency-specific (UE-specific), non-pilot frequency-specific (non-UE-specific) or radio bearer-specific (SL RB specific). Herein, the UE-specific GTP-U tunnel corresponds to the forwarding of SL signaling and/or SL data between two UE pairs served by the service node 1 and the service node 2 respectively; the SL RB specific Xn GTP-U tunnel corresponds to one or more SL RBs between two UE pairs served by the service node 1 and the service node 2 respectively. Herein, it is possible that the SL RB specific GTP-U tunnel corresponds to an SL RB or multiple SL RBs. In addition, the non-UE-specific Xn GTP-U tunnel may be used to forward the broadcast or multicast data between UEs across service nodes. In an example, for destination identities of different broadcasts or multicasts, it is possible to establish different non-UE-specific Xn GTP-U tunnels.

The GTP-U tunnel for forwarding SL signaling or SL data may be established according to the procedure shown in FIG. 3. The service node 1 sends the SL forwarding request to the service node 2, where the SL forwarding request may contain any combination of the following information: an SL transmission request, an SL receiving request, first SL forwarding user-plane transport layer information, QoS information, an SL-RB ID, PC5-S, PC5-RRC, PC5-D, an identity of a source UE, an identity of a destination UE or a destination group identity or a destination broadcast identity, a communication type (unicast or broadcast or multicast) indication. Herein, the first SL forwarding user-plane transport layer information may contain GTP tunnel information, such as a transport layer address and a GTP-TEID (tunnel endpoint identifier); the QoS information may contain any combination of the following information: a PQI, a RLC mode, a QoS parameter of an SL RB, a QoS flow identity mapping to an SL RB, a QoS parameter of a QoS flow. The service node 2, after receiving the SL forwarding request information, sends an SL forwarding response information to the service node 1. The SL forwarding response information may contain any combination of the following information: second SL forwarding user-plane transport layer information, an SL-RB ID, a QFI of acceptance, PC5-S. PC5-RRC, PC5-D, an identity of a source UE, an identity of a destination UE or a destination group identity or a destination broadcast identity. Herein, the second SL forwarding user-plane transport layer information may contain GTP tunnel information such as a transport layer address and a GTP-TEID. The first SL forwarding user-plane transport layer information contained in the SL forwarding request information corresponds to transport layer information at the side of the service node 1, and the second SL forwarding user-plane transport layer information contained in the SL forwarding response information corresponds to transport layer information at the side of the service node 2. In the case of an SL RB-specific GTP-U tunnel, then in the SL forwarding request information and the SL forwarding response information, there is a corresponding SL forwarding user-plane transport layer information, corresponding to an SL-RB ID; in the case of corresponding to a UE-specific GTP-U tunnel, then there is a piece of corresponding SL forwarding user-plane transport layer information, corresponding to an identity of a source UE and an identity of a destination UE; in the case of corresponding to a non-UE specific GTP-U tunnel of broadcast or multicast, then there is a piece of SL forwarding user-plane transport layer information, corresponding to a destination group identity or a destination broadcast identity; in the case of corresponding to a non-UE specific GTP-U tunnel of a different PC5 signaling type, there is a piece of SL forwarding user-plane transport layer information, corresponding to a PC5-S or PC5-RRC or PC5-D type. In addition, mapping one or more SL SRBs or DRBs to an Xn GTP-U tunnel may be considered.

After an SL forwarding tunnel between the service node 1 and the service node 2 is established, the service node 1 may forward the direct communication request information received from the UE1 to the neighboring service node 2 through the Xn interface, and after the service node 2 receives the direct communication request information, if the destination UE of the direct communication request being served by the service node 2 may be identified by a destination identity contained in the direct communication request information, then the service node 2 may forward the direct communication request information to the UE3; otherwise, the service node 2 sends the direct communication request information in broadcast on each cell.

The UE3 receives the direct communication request information sent by the service node 2. If the UE3 discovers that it is interested in the traffic type or that the UE ID of the UE3 corresponds to a destination UE ID or an application ID contained in the direct communication request information, then the UE3 may send the direct communication response information to the service node 2. The service node 2, after receiving the direct communication response information, sends the direct communication response information to the service node 1 through the SL forwarding tunnel of the Xn interface. The service node 1 may send the direct communication response information to the UE1 by means of unicast or broadcast.

The establishment of PC5 connection between UEs served by neighboring service nodes is implemented by the forwarding of the service nodes described above, and subsequently, between the UE2 and the UE3, the PC5 RRC signaling may be further forwarded by the service node to establish the SL DRB, and perform the SL data transmission by the forwarding of the service node.

It should be noted that the service node may perceive the proximity condition between UEs in the UE node pair in the process of forwarding the direct connection establishing information for the UE node pair, and subsequently, the service node may configure for the UE, whether to adopt the service node forwarding or to transmit the PC5 data through the device-to-device link.

Example 5

This embodiment discusses a scenario where a UE for local transmission is in an idle or inactive state. As shown in FIG. 6, assuming that the UE1 (i.e., a source UE) wishes to transmit data with the UE2 (i.e., a destination UE) that is in the RRC_IDLE or RRC_INACTIVE state, the UE1 may assemble discovery information, where the discovery information may contain any combination of the following information: an application layer ID of the source UE, an application layer ID of the destination UE, a traffic type, security information, QoS information.

UE1 may transmit the discovery information through a Uu RLC channel configured by the service node, or transmit the discovery information through a Uu SRB. After the service node 1 receives the discovery information, the service node 1 may forward the discovery information through a Uu interface. The service node 1 may send the discovery information in broadcast. The specific broadcast may be done by defining a new SIB to transmit the discovery information, or by MBS broadcasting or multicasting transmission. For the way of the MBS broadcasting or multicasting transmission, the service node 1 may configure a G-RNTI for broadcasting SL signaling or data for a UE that supports local transmission (i.e., the service node relays SL data or SL signaling) or for a UE that requests the service node to relay and forward SL signaling or SL data. In addition, the service node 1 may send the MBS broadcasting or multicast configuration of SL signaling or SL data to the UE by an MCCH or a specific signaling.

The UE2 in the RRC_IDLE or RRC_INACTIVE state receives the discovery information sent in broadcast by the service node 1. Assuming that the UE2 is interested in the traffic type or an application layer ID of the UE2 corresponds to an application layer ID of the destination UE contained in the discovery information, then the UE2 may enter the connected state and send discovery response information to the service node 1. The service node 1, after receiving the discovery response information, sends the discovery response information to the UE1. The UE1 may complete the proximity discovery process with UE2 after receiving the discovery response information sent by the service node 1. The UE1 may report the discovered information of the UE2 to the service node 1, and the service node 1, after receiving the above information, analyzes which possible paths are between the UE1 and the UE2, select the most suitable transmission path for data transmission between the UE1 and the UE2, and send the corresponding bearer configuration information and/or path configuration information to the UE1 and/or the UE2.

In addition, the UE2 in the RRC_IDLE or RRC_INACTIVE state, after receiving the discovery information sent in broadcast by the service node 1, may also send the discovery response information through a PC5 interface. If UE1 can receive the discovery response information sent by UE2, then the UE1 completes the proximity discovery process with the UE2. The UE1 may report the discovered proximity information about the UE2 to the service node 1, for example, including at least one of the following information: a UE1 L2 ID, a UE2 L2 ID, a UE1 APP ID, a UE2 APP ID, a serving cell ID of the UE2, QoS information of a data flow between the UE1 and the UE2. The service node 1, after receiving the above proximity information, analyzes which possible paths are between the UE1 and the UE2, and selects the most suitable transmission path for data transmission between the UE1 and the UE2. Assuming that the service node 1 configures the UE1 to use the service node to forward PC5 or SL data, then the UE1 may send a base station forwarding data indication to the UE2 through the PC5 interface. The UE2, after receiving the indication information, enters the RRC connected state, receives the transmission of the service node 1 or related configuration of the base station forwarding data, and subsequently, data is forwarded between the UE1 and the UE2 by the service node 1. In addition, the base station forwarding data indication sent by the UE1 to the UE2 may be encapsulated in the PC5 signaling, but sent to the service node 1 through the Uu interface, and then further sent in broadcast by the service node 1 to the UE2 in the RRC_IDLE or RRC_INACTIVE state. The UE2, after receiving the indication information, enters the RRC connected state, receives the local transmission of the service node 1 or related configuration of the base station forwarding data, and subsequently, data is forwarded between the UE1 and the UE2 by the service node 1.

Example 6

This example gives a scenario where a core network detects the proximity of the UE1 and the UE2, and indicates the service node to forward data between the UE1 and the UE2 through local transmission.

Figure 8:
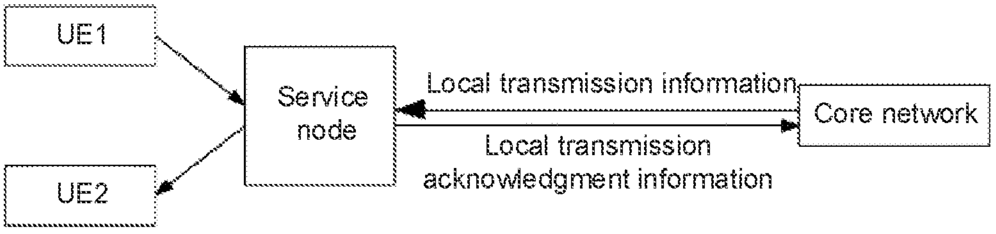
FIG. 8 is a schematic diagram of an implementation of a core network detecting a neighboring UE provided by an embodiment.

FIG. 8 is a schematic diagram of an implementation of a core network detecting a neighboring UE provided by an embodiment. As shown in FIG. 8, the UE1 and the UE2 are served by a same service node, and data transmission between the UE1 and the UE2 is implemented by a PDU (protocol data unit) session. For example, data sent from the UE1 to the UE2 passes through a service node, a core network, then to an application server, further to a core network, a service node, and finally sent from the service node to the UE2. In 5G NR (new radio), a local switch of the core network is introduced, i.e., a network element SMF (session management function) of the core network determines a forwarding rule of data PDU, and provides the forwarding rule to a network element UPF (user plane function) of the core network, the UPF may determine to transmit some data streams locally according to an IP address of the data packet, i.e., the data packet sent from the UE1 to the UE2 is directly delivered from the UPF of the UE1 to the UPF of the UE2 without passing through the application server, the UPF of the UE2 sends the data packet to the service node of the UE2, and finally the data packet is sent by the service node of the UE2 to the UE2. In addition, if the UE1 and the UE2 are served by a same UPF, then the UPF, after receiving the data packet from the UE1, directly delivers the data packet to the PDU session corresponding to the UE2, the data packet is sent to the service node of the UE2, and finally, the data packet is sent by the service base station of the UE2 to the UE2.

In an example, when the data transmission between the UE1 and the UE2 is initiated, the network element (such as the SMF) of the core network may determine whether the PDU sessions of the two UEs correspond to each other according to the source and destination IP addresses of the data packet, and if these two UEs also belong to a same local area network or local transmission group, then the SMF may inform the network element (such as an AMF (access and mobility management function)) of the core network about the identity information of the corresponding two UEs. The network element of the core network (such as the AMF), after receiving the information, further determines serving cell and/or service node information of these two UEs. Generally, when the UE accesses the network, the service node sends location information of the UE to the AMF, where the location information of the UE may be an NCGI (NR cell global identifier), a TAI (tracking area identity), PScell (primary serving cell) information, and a time stamp corresponding to the location information. If the UE1 and the UE2 are served by a same service node, or are served by two service nodes but there is a direct interface such as an Xn interface between these two service nodes, then the AMF may inform the service node of the UE1 and the UE2 about the proximity information and/or data transmission information of the UE1 and the UE2, e.g., the AMF sends to the service node of the UE1 any combination of the local transmission information of the UE1 and the UE2: a service node forwarding request or indication, QoS flow information (such as a QFI), a QoS parameter, a peer UE identity, a service node identity of a peer UE, a serving cell identity of a peer UE. The service node of the UE1, after receiving the above information, may determine whether to perform service node local data forwarding according to the QoS parameter and/or air interface resources. In an example, the service node may send to the AMF any combination of local transmission acknowledgment information of the UE1 and the UE2: a service node forwarding response, QoS flow information that is forwardable by the service node (such as a QFI, a QoS parameter of the QoS flow), a peer UE identity, a service node identity of a peer UE, a serving cell identity of a peer UE, QoS flow information of the UE1 that is not forwardable by the service node (such as a QFI), and a reason for being not forwardable by the service node.

After the service node decides which QoS flows for forwarding, the service node configures a Uu RLC Channel for the UE1 and/or the UE2 for transmitting data forwarded by the service node between the UE1 and the UE2. In addition, the service node configures a UE identity corresponding to the UE2 for the UE1. Before forwarding data between the UE1 and the UE2 by the service node, the UE1 and the UE2 may use the Uu RLC channel configured by the service node to transmit PC5-S signaling and/or PC5-RRC, thereby completing PC5 connection establishment, security authentication, secret key establishment and/or SL RB related configuration. In addition, the service node may send to the UE1 and/or the UE2, a PDCP and/or SDAP configuration corresponding to the SL RB, an RLC entity corresponding to the Uu RLC channel, a configuration of a logical channel, and/or a configuration of the SL RB to the Uu RLC channel. Herein, the SDAP configuration of the SL RB contains which QoS flows are mapped to the SL RB, i.e., QFIs are mapped to the SL RB. Or, the base station sends a mapping of the QFI to the PFI and/or a mapping of the PFI to the SL RB, to the UE. After the SL RB and Uu RLC channel configurations are completed, the UE1 and the UE2 may map the data packet of the corresponding QoS flow to the SL RB and transmit the data packet through the Uu RLC channel.

In addition that the service node configures the SL RB and the Uu RLC channel, in order to reduce the delay of the transmission path switching, the SL SRB and/or PC5-S signaling and/or PC5 RRC signaling may be delivered by a fixed-configured or a default configured Uu RLC channel.

In an example, it may be considered that, the service node receives service node forwarding authorization indication corresponding to a certain UE from the AMF, and only if the UE authorizes the service node forwarding, the service node considers to forward data between the UEs locally by the service node.

In an example, in addition that the above AMF informs the service node about the proximity between the UEs, and the service node decides whether to forward, it may also be considered that the AMF sends local transmission information of the UE1 and the UE2 to the UE1, and the local transmission information includes any combination of the following information: a service node forwarding request or indication, QoS flow information that is forwardable by the service node such as a QFI, a QoS parameter, a peer UE identity, a service node identity of a peer UE, and a serving cell identity of a peer UE. The UE1, after receiving the above information, may send a local forwarding request indication to the service node, establish a PC5 connection by the forwarding of the service node, and transmit data of the corresponding QoS flow by the forwarding of the service node.

Figure 9:
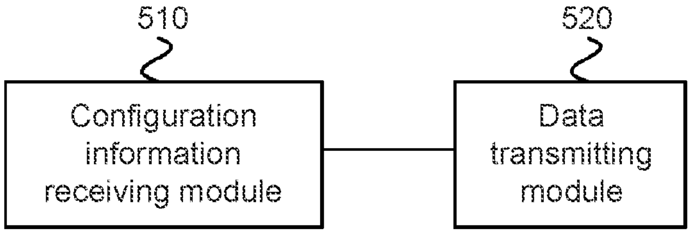
FIG. 9 is a structural schematic diagram of a data transmission apparatus provided by an embodiment.

The embodiments of the present disclosure further provide a data transmission apparatus. FIG. 9 is a structural schematic diagram of a data transmission apparatus provided by an embodiment. As shown in FIG. 9, the data transmission apparatus includes:

- a configuration information receiving module 510, configured to receive transmission configuration information; and
- a data transmitting module 520, configured to transmit data according to the transmission configuration information.

The data transmission apparatus of this embodiment, e.g., a UE, transmits data according to the transmission configuration information, so that the service node may analyze a potentially possible transmission path, comprehensively consider the policy, the channel state, the load and other factors, and configure the most suitable transmission path for the data transmission between the UE node pair, thereby performing the corresponding transmission to ensure to arrive most efficiently, and improve flexibility of data transmission between the UEs.

In an embodiment, the apparatus further includes: a proximity information sending module configured to send proximity information of a destination user equipment (UE).

In an embodiment, the proximity information includes at least one of: an identity of a source UE, an identity of a destination UE, a transmission type, an application identity of the source UE, an application identity of the destination UE, a serving cell identity of the destination UE, a service node identity of the destination UE, a link state between the source UE and the destination UE, quality of service (QOS) of a data stream between the source UE and the destination UE, a hop count between the source UE and the destination UE, and a node identity of a relay node; where the link state includes at least one of: a link measurement result, a link load, an SL resource utilization rate.

In an embodiment, the transmission configuration information includes bearer configuration information and/or path configuration information.

In an embodiment, the bearer configuration information includes at least one of the following information: a Uu radio link control (RLC) protocol channel configuration; a Uu RLC channel identity; a Uu logical channel configuration; a service data adaptation protocol (SDAP) configuration corresponding to a sidelink radio bearer (SL RB); a packet data convergence protocol (PDCP) configuration corresponding to an SL RB; and mapping information between an SL RB and a Uu RLC channel.

In an embodiment, the bearer configuration information includes at least one of the following information: SDAP configuration corresponding to an SL RB, PDCP configuration corresponding to an SL RB, PC5 RLC channel configuration, and PC5 logical channel configuration.

In an embodiment, the bearer configuration information includes mapping information between an information type and a Uu RLC channel; where the information type includes at least one of: discovery information, PC5-S, PC5 radio resource control (RRC) information, an SL signaling radio bearer (SRB) identity, and an SL data radio bearer (DRB) identity.

In an embodiment, the path configuration information includes one of: a Uu transmission path; an SL transmission path; a Uu transmission path and an SL transmission path.

In an embodiment, the data transmitting module 520 is configured to:

in response to the transmission configuration information including a Uu transmission path, or including Uu RLC channel configuration and an SL SRB associated with the Uu RLC channel, or including Uu RLC channel configuration and mapping information between an SL RB and a Uu RLC channel, transmitting corresponding SL RB data through a Uu interface;

in response to the transmission configuration information including an SL transmission path, or including at least one of SDAP configuration corresponding to an SL RB, PDCP configuration corresponding to an SL RB, PC5 RLC channel configuration and PC5 logical channel configuration, transmit the corresponding SL RB data by a PC5 interface;

in response to the transmission configuration information including the SL transmission path and the Uu transmission path, or including Uu RLC channel configuration corresponding to an SL RB and PC5 RLC channel configuration, transmit the corresponding SL RB data by at least one of the Uu interface and the PC5 interface.

In an embodiment, the transmission configuration information further includes at least one of:

a data duplication indication, a data separation transmission indication, a data split threshold, a data split ratio, a primary path indication, a secondary path indication, a path switching indication;

where the path switching indication includes at least one of: an identity of a source UE, an identity of a destination UE, an SL RB identity, and path indication.

In an embodiment, the data transmitting module is configured to:

transmit corresponding SL RB data with the destination UE through a Uu interface and a PC5 interface by means of data duplication or data split.

In an embodiment, the apparatus further includes:

a first information sending module, configured to send first discovery information or SL signaling or SL data through a PC5 interface.

In an embodiment, the apparatus further includes: a second information receiving module, configured to receive, through a PC5 interface, second discovery information or SL signaling or SL data sent by a destination UE or forwarded by a relay UE;

where the second discovery information includes at least one of: an application layer identity of the destination UE, a service node identity of the destination UE, a serving cell identity, a resident cell identity, maximum hop count information, transmitted hop count information, and a node identity of a relay node.

In an embodiment, the apparatus further includes: a transmission indication sending module, configured to send local transmission capability information or transmission indication information, where the local transmission capability information or transmission indication information is used to indicate or request a service node to transmit discovery information or SL signaling or SL data by a Uu interface.

In an embodiment, discovery information or SL signaling or SL data is forwarded by a service node through a Uu interface by means of unicast or broadcast or multicast.

In an embodiment, the discovery information or the SL signaling or the SL data forwarded by the Uu interface carries an identity of a source UE, an identity of a destination UE, and/or an SL RB identity.

In an embodiment, in a case where the discovery information or the SL signaling or the SL data is forwarded by the service node by means of MBS broadcast or multicast, transmitting, by the service node, MBS broadcasting or multicasting configuration of the discovery information or the SL signaling or the SL data by a multicast control channel (MCCH) or a specific signaling;

where the MBS broadcasting or multicasting configuration includes at least one of: a group radio network temporary identity (G-RNTI) for broadcasting the SL signaling or the SL data, an SL information type, and multicast traffic channel (MTCH) scheduling information;

where the SL information type includes at least one of: an SL traffic type, an SL SRB, SL DRB, PC5-S, and PC5-RRC;

the MTCH scheduling information includes at least one of: an on-line duration after a UE is woken up within a discontinuous reception (DRX) cycle, a duration to remain active after each successful decoding of a physical downlink control channel (PDCCH) after being woken up, a scheduling cycle, and a scheduling offset.

In an embodiment, the apparatus further includes: a discovery information receiving module, configured to receive, through a Uu interface, discovery information or SL signaling or SL data sent by a destination UE and forwarded by the service node, the discovery information or the SL signaling or the SL data carries an identity of a source UE, an identity of a destination UE, and/or an SL RB identity.

In an embodiment, in response to a known UE associated with a destination identity, sending, by the service node, a data packet including the discovery information or the SL data or the SL signaling to the UE associated with the destination identity by means of unicast; where the UE associated with the destination identity includes at least one of: a UE corresponding to the destination identity, and/or a UE interested in receiving the destination identity.

In an embodiment, the apparatus further includes: a second information sending module, configured to send at least one of the following to a service node:

a UE identity assigned by an NGC, a destination identity corresponding to an interested traffic type, and a transmission type corresponding to a destination identity.

In an embodiment, the apparatus further includes: a forwarding indication sending module, configured to send a service node forwarding SL data indication to a destination UE.

In an embodiment, in response to the destination UE being in an idle or inactive state, entering, by the destination UE, an RRC connected state after receiving the service node forwarding SL data indication.

In an embodiment, the apparatus further includes: a transmission indication receiving module configured to receive a local transmission indication information sent by a network element of a core network, where the local transmission indication information is used to indicate or request a service node to transmit discovery information or SL signaling or SL data through a Uu interface;

where the local transmission indication information includes at least one of: a service node forwarding request or indication, an identity of a source UE, an identity of a destination UE, a service node identity of the source UE, a service node identity of the destination UE, a serving cell identity of the source UE, a serving cell identity of the destination UE, and QoS flow information;

where the QoS flow information includes at least one of: a QoS flow identity (QFI), a QoS parameter.

In an embodiment, the transmission configuration information is sent by a service node; the service node includes a base station, a distributed unit (DU), a centralized unit (CU), or an integrated access backhaul (IAB) node.

The data transmission apparatus proposed in this embodiment belongs to the same inventive concept as the data transmission methods proposed in the above embodiments, and technical details not exhaustively described in this embodiment may be found in any of the above embodiments, and this embodiment has the same beneficial effect as performing the data transmission methods.

Figure 10:
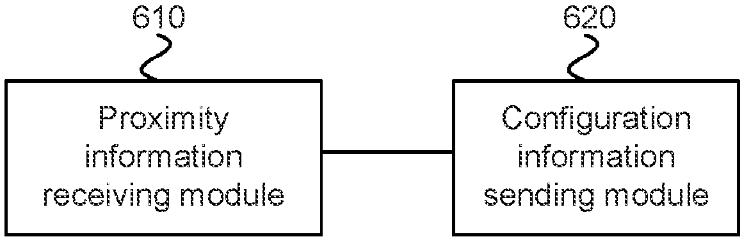
FIG. 10 is a structural schematic diagram of a data transmission apparatus provided by another embodiment.

The embodiments of the present disclosure further provide a data transmission apparatus. FIG. 10 is a structural schematic diagram of a data transmission apparatus provided by another embodiment. As shown in FIG. 10, the data transmission apparatus includes:

a proximity information receiving module 610, configured to receive proximity information about a destination UE; and a configuration information sending module 620, configured to send transmission configuration information according to the proximity information.

The data transmission apparatus of this embodiment may send the corresponding transmission configuration information to the source UE and the destination UE by receiving the proximity information about the destination UE. Specifically, the service node may use the proximity information reported by the UE or information indicated by the core network to identify a relative position between UEs, a serving cell, an interface state of a DU or a CU, etc., analyze a potentially possible transmission path, comprehensively consider the policy, the channel state, the load and other factors, and configure the most suitable transmission path for the data transmission between the UE node pair, thereby performing the corresponding transmission, so as to ensure to arrive most efficiently, and improve the flexibility of data transmission between UEs.

In an embodiment, the proximity information is sent by a source UE, or sent by a network element of a core network.

In an embodiment, the apparatus further includes: a discovery information receiving module, configured to receive discovery information or SL signaling or SL data, the discovery information or the SL signaling or the SL data carries an identity of a source UE, an identity of a destination UE, and/or an SL RB identity.

In an embodiment, the apparatus further includes: a transmission indication receiving module, configured to receive local transmission capability information or transmission indication information, where the local transmission capability information or the transmission indication information is used to indicate or request a service node to transmit the discovery information or the SL signaling or the SL data through a Uu interface.

In an embodiment, the apparatus further includes: a discovery information forwarding module configured to forward the discovery information or the SL signaling or the SL data through the Uu interface by means of unicast or broadcast or multicast.

In an embodiment, the apparatus further includes: a configuration transmitting module configured to: in a case where the discovery information or the SL signaling or the SL data is forwarded by the service node by means of MBS broadcast or multicast, transmit MBS broadcasting or multicasting configuration of the SL signaling or the SL data via an MCCH or a specific signaling;

where the MBS broadcasting or multicasting configuration includes at least one of: a G-RNTI, an SL information type, and MTCH scheduling information;

where the SL information type includes at least one of: an SL traffic type, an SL SRB, SL DRB, PC5-S, and PC5-RRC;

the MTCH scheduling information includes at least one of: an on-line duration after a UE is woken up within a discontinuous reception (DRX) cycle, a duration to remain active after each successful decoding of a PDCCH after being woken up, a scheduling cycle, and a scheduling offset.

In an embodiment, in response to a known UE associated with a destination identity, the apparatus further includes:

a unicast module, configured to send a data packet including the discovery information or the SL data or the SL signaling to the UE associated with the destination identity by means of unicast; where the UE associated with the destination identity includes at least one of: a UE corresponding to the destination identity, and/or a UE interested in receiving the destination identity.

The data transmission apparatus proposed in this embodiment belongs to the same inventive concept as the data transmission methods proposed in the above embodiments, and technical details not exhaustively described in this embodiment may be found in any of the above embodiments, and this embodiment has the same beneficial effect as performing the data transmission methods.

Figure 11:
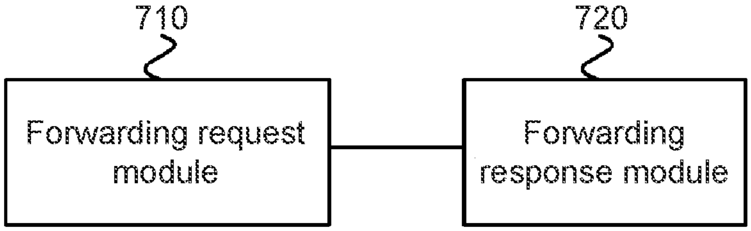
FIG. 11 is a structural schematic diagram of a data transmission apparatus provided by a further embodiment.

The embodiments of the present disclosure further provide a data transmission apparatus. FIG. 11 is a structural schematic diagram of a data transmission apparatus provided by a further embodiment. As shown in FIG. 11, the data transmission apparatus includes:

a forwarding request module 710, configured to send SL forwarding request information; and a forwarding response module 720, configured to receive SL forwarding response information.

The data transmission apparatus of this embodiment sends the SL forwarding request information to a service node of a destination UE, and receives the SL forwarding response information sent by the service node of the destination UE, thereby establishing an SL forwarding tunnel to implement the SL data transmission between UEs across the service nodes, and further, improving flexibility of the data transmission between the UEs.

In an embodiment, the SL forwarding request information includes at least one of: an SL sending request, an SL receiving request, first SL forwarding user-plane transport layer information, QoS information, an SL RB identity, PC5-S, PC5-RRC, PC5-D, an identity of a source UE, an identity of a destination UE or a destination group identity or a destination broadcast identity, and a unicast or multicast indication;

where the first SL forwarding user-plane transport layer information includes general packet radio service (GPRS) tunneling protocol information;

the QoS information includes at least one of: a PQI, an RLC mode, a QoS parameter of an SL RB, a QoS flow identity mapped to an SL RB, and a QoS parameter of a QoS flow.

In an embodiment, the SL forwarding response information includes at least one of: second SL forwarding user-plane transport layer information, an SL RB identity of acceptance and/or non-acceptance, a QFI of acceptance and/or non-acceptance, PC5-S, PC5-RRC, PC5-D, an identity of a source UE, an identity of a destination UE or a destination group identity or a destination broadcast identity;

where the second SL forwarding user-plane transport layer information includes GPRS tunneling protocol information of a destination service node.

In an embodiment, the apparatus further includes:

a node determining module, configured to determine a destination service node of discovery information or SL data or SL signaling that is to be forwarded according to a destination identity contained in the discovery information or the SL data or the SL signaling, and/or, determine an SL forwarding tunnel of SL data or SL signaling with the destination service node according to an SL RB identity contained in discovery information or SL data or SL signaling that is to be forwarded; and deliver the discovery information or the SL data or the SL signaling that is to be forwarded to the SL forwarding tunnel and forward the discovery information or the SL data or the SL signaling to the destination service node.

In an embodiment, the discovery information or the SL information or the SL signaling is forwarded by the destination service node to a destination UE, or is broadcast in each serving cell of the destination service node.

In an embodiment, the SL forwarding request information is sent by a first service node and the SL forwarding response information is sent by a second service node;

where the first service node is a first base station, a first distributed unit, a first centralized unit, a first IAB node, or a third distributed unit;

correspondingly, the second service node is a second base station, a second distributed unit, a second centralized unit, a second IAB node, or a third centralized unit.

The data transmission apparatus proposed in this embodiment belongs to the same inventive concept as the data transmission methods proposed in the above embodiments, and technical details not exhaustively described in this embodiment may be found in any of the above embodiments, and this embodiment has the same beneficial effect as performing the data transmission methods.

Figure 12:
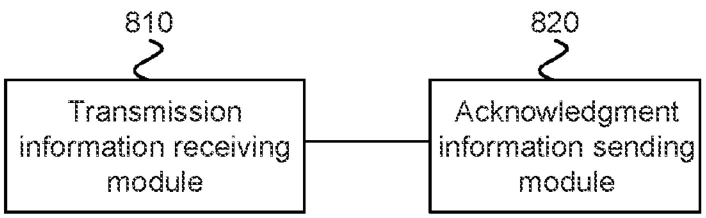
FIG. 12 is a structural schematic diagram of a data transmission apparatus provided by yet another embodiment.

The embodiments of the present disclosure further provide a data transmission apparatus. FIG. 12 is a structural schematic diagram of a data transmission apparatus provided by yet another embodiment. As shown in FIG. 12, the data transmission apparatus includes:

a transmission information receiving module 810, configured to receive local transmission information of a UE; and an acknowledgment information sending module 820, configured to send local transmission acknowledgment information to a core network.

The data transmission apparatus of this embodiment receives the local transmission information sent by a network element of the core network and sends the local transmission acknowledgment information to the core network, thereby with the assistance of the core network, completing proximity discovery and SL data transmission between UEs, and improving flexibility of the data transmission between UEs.

In an embodiment, the apparatus further includes: a configuration information sending module, configured to send transmission configuration information to the UE.

In an embodiment, the local transmission information is sent by a network element of the core network; the local transmission information includes at least one of: a service node forwarding discovery information or SL signaling or SL data authorization indication of the UE, a service node forwarding request or indication, an identity of a source UE, an identity of a destination UE, a service node identity of the source UE, a service node identity of the destination UE, a serving cell identity of the source UE, a serving cell identity of the destination UE, and QoS flow information; where the QoS flow information includes at least one of: a QFI, a QoS parameter.

In an embodiment, the local transmission acknowledgment information includes at least one of: a service node local forwarding response, QoS flow information of a source UE that is forwardable by a service node, QoS flow information of the source UE that is not forwardable by the service node, and a reason for being not forwardable by the service node.

In an embodiment, SL RB data is transmitted by a source UE or a destination UE through a Uu interface RLC channel.

In an embodiment, the apparatus further includes:

a discovery information forwarding module, configured to: in response to receiving service node forwarding authorization indication of the UE, forward SL signaling or SL data of the UE.

In an embodiment, PC5-S and/or PC5-RRC are transmitted by the source UE and the destination UE through a fixed-configured or default-configured Uu interface RLC channel.

The data transmission apparatus proposed in this embodiment belongs to the same inventive concept as the data transmission methods proposed in the above embodiments, and technical details not exhaustively described in this embodiment may be found in any of the above embodiments, and this embodiment has the same beneficial effect as performing the data transmission methods.

Figure 13:
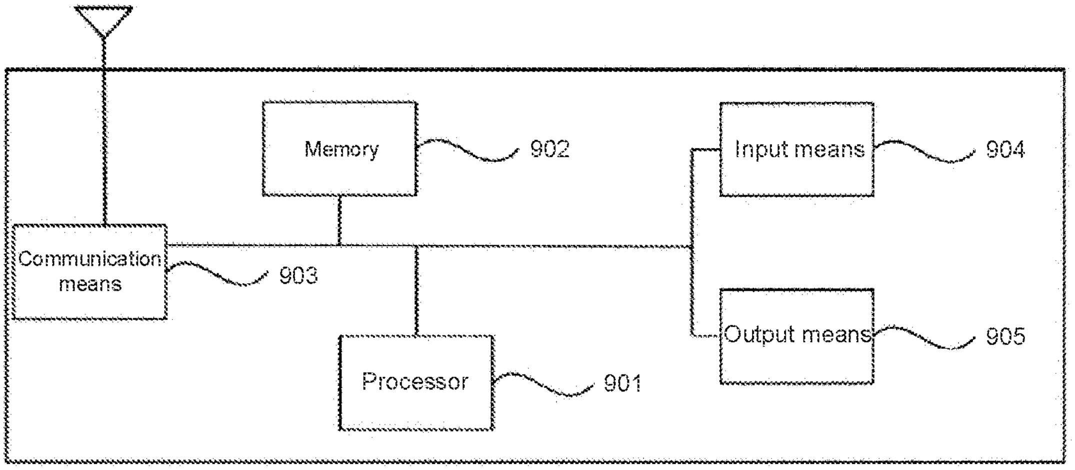
FIG. 13 is a hardware structural schematic diagram of a user equipment provided by an embodiment.

The embodiments of the present disclosure further provide a user equipment, FIG. 13 is a structural schematic diagram of a user equipment provided by an embodiment. As shown in FIG. 13, the user equipment provided by the present disclosure includes a memory 902, a processor 901, and a computer program stored in the memory and runnable on the processor, and the processor 901, upon executing the program, implements the above-described data transmission methods.

The user equipment may further include the memory 902; the processor 901 in the user equipment may be one or more, and one processor 901 is taken as an example in FIG. 13; the memory 902 is configured to store one or more programs; the one or more programs, upon being executed by the one or more processors 901, causes the one or more processors 901 to implement the above-described data transmission method in the embodiments of the present disclosure.

The user equipment further includes: a communication means 903, an input means 904, and an output means 905.

The processor 901, the memory 902, the communication device 903, the input device 904, and the output device 905 in the user equipment may be connected by a bus or in other ways, and the connection through the bus is taken as an example in FIG. 13.

The input means 904 may be used to receive an input digital or character information, and generate a key signal input related to a user setting and function control of the user equipment. The output means 905 may include a display means such as a display screen, etc.

The communication means 903 may include a receiver and a transmitter. The communication means 903 is configured to communicate information according to the control of the processor 901.

The memory 902, as a computer-readable storage medium, may be configured to store a software program, a computer-executable program, and a module, such as a program instruction/module (e.g., the configuration information receiving module 510, data transmitting module 520 in the data transmitting apparatus) corresponding to the data transmission methods in the embodiments of the present disclosure. The memory 902 may include a storage program area and a storage data area, where the storage program area may store an operating system, an application program required for at least one function; and the storage data area may store data created according to the usage of the user equipment, and so on. Additionally, the memory 902 may include a high speed random access memory, and may also include a non-volatile memory, such as at least one magnetic disk storage device, a flash memory device, or other non-volatile solid state storage device. In some examples, the memory 902 may further include memories disposed remotely with respect to the processor 901, and these remote memories may be connected to the user equipment through a network. Examples of the above networks include, but are not limited to, the Internet, an intranet, a local area network, mobile communication networks and combinations thereof.

Figure 14:
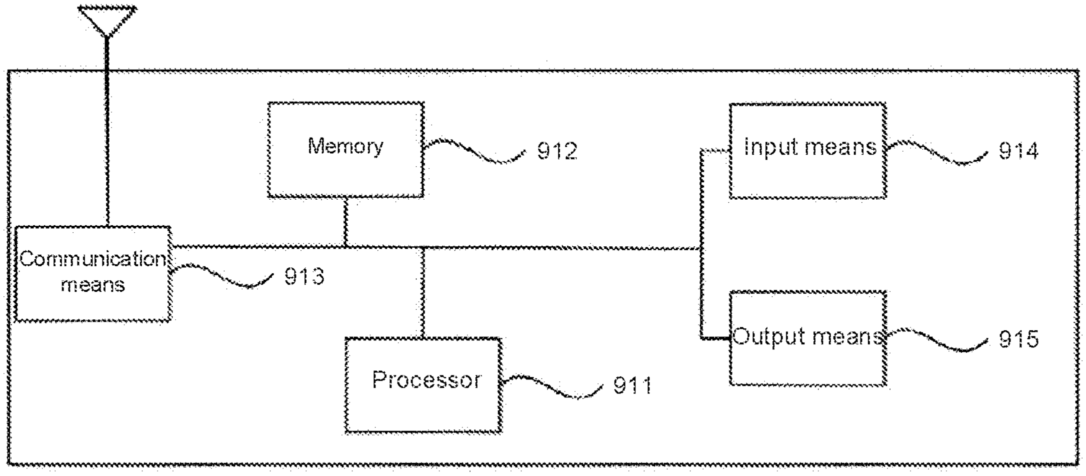
FIG. 14 is a hardware structural schematic diagram of a service node provided by an embodiment.

The embodiments of the present disclosure further provide a service node, and FIG. 14 is a structural schematic diagram of a service node provided by an embodiment. As shown in FIG. 14, the service node provided by the present disclosure includes a memory 912, a processor 911, and a computer program stored in the memory and runnable on the processor, and the processor 911, when executing the program, implements the above-described data transmission methods.

The service node may further include the memory 912; the processor 911 in the service node may be one or more, and one processor 911 is taken as an example in FIG. 14; the memory 912 is used for storing one or more programs; the one or more programs are executed by the one or more processors 911, so that the one or more processors 911 implement the above-described data transmission methods in the embodiments of the present disclosure.

The service node further includes: a communication means 913, an input means 914 and an output means 915.

The processor 911, the memory 912, the communication means 913, the input means 914, and the output means 915 in the service node may be connected by a bus or in other ways, and the connection through the bus is taken as an example in FIG. 14.

The input means 914 may be used to receive an input digital or character information, and generate a key signal input related to a user setting and a function control of the service node. The output means 915 may include a display means such as a display screen, etc.

The communication means 913 may include a receiver and a transmitter. The communication means 913 is configured to communicate information according to the control of the processor 911.

The memory 912, as a computer-readable storage medium, may be configured to store a software program, a computer-executable program, and a module, such as a program instruction/module (e.g., the proximity information receiving module 610, the configuration information sending module 620 in the data transmitting apparatus) corresponding to the data transmission methods as described in the embodiments of the present disclosure. The memory 912 may include a storage program area and a storage data area, where the storage program area may store an operating system, an application program required for at least one function; and the storage data area may store data created according to the usage of the service node, and so on. Additionally, the memory 912 may include a high speed random access memory, and may also include a non-volatile memory, such as at least one magnetic disk storage device, a flash memory device, or other non-volatile solid state storage device. In some examples, the memory 912 may further include memories disposed remotely relative to the processor 911, and these remote memories may be connected to the service node by a network. Examples of the above networks include, but are not limited to, the Internet, an intranet, a local area network, mobile communication networks and combinations thereof.

The embodiments of the present disclosure further provide a storage medium having stored a computer program thereon, the computer program, upon being executed by a processor, implements the above-described data transmission method in any one of the embodiments of the present disclosure. The method includes: receiving transmission configuration information; and transmitting data according to the transmission configuration information. Or, the method includes: receiving proximity information about a destination UE; and sending path configuration information according to the proximity information. Or, the method includes: sending SL forwarding request information; and receiving SL forwarding response information. Or, the method includes: receiving local transmission information of a UE; and sending local transmission acknowledgment information to a core network.

The computer storage medium in the embodiments of the present disclosure may adopt any combination of one or more computer readable media. The computer readable medium may be a computer readable signal medium or a computer readable storage medium. A computer-readable storage medium may be, for example, but not limited to, an electrical, magnetic, optical, electromagnetic, infrared, or semiconductor system, apparatus or means, or any combination thereof. More specific examples (a non-exhaustive list) of a computer-readable storage medium include: an electrical connection with one or more wires, a portable computer magnetic disk, a hard disk, a random access memory (RAM), a read-only memory (ROM), an erasable programmable read-only memory (EPROM), a flash memory, an optical fiber, a portable CD-ROM, an optical storage means, a magnetic storage means, or any suitable combination of the above. A computer readable storage medium may be any tangible medium that contains or stores a program which is used by or in combination with, an instruction executing system, apparatus, or means.

A computer readable signal medium may include a data signal, which is propagated in a baseband or as a part of a carrier wave, and in which a computer readable program code is carried. Such a propagated data signal may have many forms, including but not limited to: an electromagnetic signal, an optical signal, or any suitable combination of the above. A computer readable signal medium may also be any computer readable medium other than the computer readable storage medium, and the computer readable medium may send, propagate, or transmit the program which is used by or in combination with the instruction executing system, apparatus, or means.

A program code contained on the computer readable medium may be transmitted using any appropriate medium, including but not limited to: wireless, wire, optical cable, radio frequency (RF), etc., or any suitable combination of the above.

The computer program code for performing operations of the present disclosure may be written in one or more programming languages, or a combination thereof, including an object-oriented programming language—such as Java, Smalltalk, C++, and also including conventional procedural programming language—such as "C" language or a similar programming language. The program code may be executed entirely a user's computer, partly on the user's computer, as a stand-alone software package, partly on the user's computer and partly on a remote computer, or entirely on the remote computer or a server. In a case where the remote computer is involved, the remote computer may be connected to the user's computer by any kind of network, including a local area network (LAN) or a wide area network (WAN), or may be connected to an external computer (e.g., connected by the Internet using an Internet service provider).

The foregoing is only the exemplary embodiments of the present disclosure and is not used to limit the scope of protection of the present disclosure.

Those skilled in the art should understand that, the term "user terminal" covers any suitable type of wireless user equipment, for example, a mobile phone, a portable data processing apparatus, a portable web browser or a vehicle-mounted mobile station.

In general, many embodiments of the present disclosure may be implemented in a hardware or an application specific circuit, a software, a logic or any combination thereof. For example, in some aspects, the embodiments may be implemented in the hardware, and in other aspects, the embodiments may be implemented in the hardware or the software which may be executed by a controller, a microprocessor or other computing apparatuses, although the present disclosure is not limited herein.

The embodiments of the present disclosure may be implemented by a data processor of a mobile apparatus (e.g., in a processor entity, or by the hardware, or by a combination of the software and the hardware) executing the computer program instruction. The computer program instructions may be assembly instructions, instruction set architecture (ISA) instructions, machine instructions, machine-related instructions, microcodes, firmware instructions, state setting data, or source codes or object codes written in any combination of one or more programming languages.

The block diagrams of any logic flow in the drawings of the present disclosure may represent program steps, or may represent the interconnected logic circuits, modules, and functions, or may represent a combination of program steps, and logic circuits, modules and functions. The computer program may be stored on the memory. The memory may be of any type suitable for the local technical environment and may be implemented by using any suitable data storage technology, for example, but is not limited to, a read-only memory (ROM), a random access memory (RAM), or an optical memory apparatus and system (Digital Video Disc (DVD) or Compact Disk (CD)), etc. The computer readable medium may include a non-transitory storage medium. The data processor may be of any type suitable for the local technical environment, for example, but not limited to, a general purpose computer, an application specific computer, a microprocessor, a digital signal processor (DSP), an application specific integrated circuit (ASIC), a field-programmable gate array (FPGA), and a processor based on a multi-core processor architecture.

By exemplary and non-limiting examples, the detailed description of exemplary embodiments of the present disclosure has been provided above. However, a variety of modifications and adjustments to the above embodiments are apparent to those skilled in the art when considered in conjunction with the drawings and claims, without departing from the scope of the present disclosure. Therefore, the proper scope of the present disclosure will be determined in accordance with the claims.

What is claimed is:

1. A data transmission method, comprising:

receiving transmission configuration information; and transmitting data according to the transmission configuration information; wherein transmitting the data according to the transmission configuration information, comprises:

in response to the transmission configuration information comprising a Uu transmission path, or comprising Uu RLC channel configuration and an SL SRB associated with a Uu RLC channel, or comprising Uu RLC channel configuration and mapping information between an SL RB and a Uu RLC channel, transmitting corresponding SL RB data through a Uu interface;

in response to the transmission configuration information comprising an SL transmission path, or comprising at least one of SDAP configuration corresponding to an SL RB, PDCP configuration corresponding to an SL RB, PC5 RLC channel configuration and PC5 logical channel configuration, transmitting the corresponding SL RB data through a PC5 interface;

in response to the transmission configuration information comprising an SL transmission path and a Uu transmission path, or comprising Uu RLC channel configuration corresponding to an SL RB and PC5 RLC channel configuration, transmitting the corresponding SL RB data through at least one of a Uu interface and a PC5 interface.

2. The method according to claim 1, further comprising: sending proximity information of a destination user equipment (UE);

wherein the proximity information comprises at least one of:

an identity of a source UE, an identity of a destination UE, a transmission type, an application identity of the source UE, an application identity of the destination UE, a serving cell identity of the destination UE, a service node identity of the destination UE, a link state between the source UE and the destination UE, quality of service (QoS) of a data stream between the source UE and the destination UE, a hop count between the source UE and the destination UE, and a node identity of a relay node;

wherein the link state comprises at least one of: a link measurement result, a link load, and a sidelink (SL) resource utilization rate.

3. The method according to claim 1, wherein:

the transmission configuration information comprises at least one of bearer configuration information and path configuration information; or the transmission configuration information further comprises at least one of: a data duplication indication, a data separation transmission indication, a data split threshold, a data split ratio, a primary path indication, a secondary path indication, a path switching indication; wherein the path switching indication comprises at least one of: an identity of a source UE, an identity of a destination UE, an SL RB identity, and path indication.

4. The method according to claim 3, wherein:

the bearer configuration information comprises at least one of: a Uu radio link control (RLC) protocol channel configuration, a Uu RLC channel identity; a Uu logical channel configuration, a service data adaptation protocol (SDAP) configuration corresponding to a sidelink radio bearer (SL RB), a packet data convergence protocol (PDCP) configuration corresponding to an SL RB, and mapping information between an SL RB and a Uu RLC channel; or the bearer configuration information comprises at least one of: SDAP configuration corresponding to an SL RB, PDCP configuration corresponding to an SL RB, PC5 RLC channel configuration, and PC5 logical channel configuration; or the bearer configuration information comprises mapping information between an information type and a Uu RLC channel; wherein the information type comprises at least one of: discovery information, PC5-S, PC5 radio resource control (RRC) information, an SL signaling radio bearer (SRB) identity, and an SL data radio bearer (DRB) identity.

5. The method according to claim 3, wherein the path configuration information comprises one of:

a Uu transmission path, an SL transmission path, a Uu transmission path and an SL transmission path.

6. The method according to claim 3, wherein transmitting the data according to the transmission configuration information, comprises:

transmitting corresponding SL RB data with a destination UE through a Uu interface and a PC5 interface by means of data duplication or data split.

7. The method according to claim 1, further comprising:

sending first discovery information or SL signaling or SL data through a PC5 interface; or receiving, through a PC5 interface, second discovery information or SL signaling or SL data sent by a destination UE or forwarded by a relay UE; wherein the second discovery information comprises at least one of: an application layer identity of the destination UE, a service node identity of the destination UE, a serving cell identity, a resident cell identity, maximum hop count information, transmitted hop count information, and a node identity of a relay node.

8. The method according to claim 1, further comprising:

sending local transmission capability information or transmission indication information, wherein the local transmission capability information or the transmission indication information is used to indicate or request a service node to transmit discovery information or SL signaling or SL data through a Uu interface;

wherein the discovery information or the SL signaling or the SL data is forwarded by a service node through a Uu interface by means of unicast or broadcast or multicast;

wherein the discovery information or the SL signaling or the SL data forwarded through the Uu interface carries at least one of: an identity of a source UE, an identity of a destination UE, and an SL RB identity.

9. The method according to claim 8, further comprising:

in a case where the discovery information or the SL signaling or the SL data is forwarded by the service node by means of multicast broadcast service (MBS) broadcast or multicast, transmitting, by the service node, MBS broadcasting or multicasting configuration of the discovery information or the SL signaling or the SL data by a multicast control channel (MCCH) or a specific signaling;

wherein the MBS broadcasting or multicasting configuration comprises at least one of: a group radio network temporary identity (G-RNTI) for broadcasting the SL signaling or the SL data, an SL information type, and multicast traffic channel (MTCH) scheduling information;

wherein the SL information type comprises at least one of: an SL traffic type, an SL SRB, SL DRB, PC5-S, and PC5-RRC;

the MTCH scheduling information comprises at least one of: an on-line duration after a UE is woken up within a discontinuous reception (DRX) cycle, a duration to remain active after each successful decoding of a physical downlink control channel (PDCCH) after being woken up, a scheduling cycle, and a scheduling offset.

10. The method according to claim 1, further comprising:

receiving, through a Uu interface, discovery information or SL signaling or SL data sent by a destination UE and forwarded by a service node, wherein the discovery information or the SL signaling or the SL data carries at least one of: an identity of a source UE, an identity of a destination UE, and an SL RB identity; or receiving a local transmission indication information sent by a network element of a core network, wherein the local transmission indication information is used to indicate or request a service node to transmit discovery information or SL signaling or SL data through a Uu interface; wherein the local transmission indication information includes at least one of: a service node forwarding request or indication, an identity of a source UE, an identity of a destination UE, a service node identity of the source UE, a service node identity of the destination UE, a serving cell identity of the source UE, a serving cell identity of the destination UE, and QoS flow information; wherein the QoS flow information comprises at least one of: a QoS flow identity (QFI), a QoS parameter.

11. The method according to claim 8, further comprising:

in response to a known UE associated with a destination identity, sending, by the service node, a data packet comprising the discovery information or the SL data or the SL signaling to the UE associated with the destination identity by means of unicast;

wherein the UE associated with the destination identity comprises at least one of: a UE corresponding to the destination identity, a UE interested in receiving the destination identity.

12. The method according to claim 1, further comprising:

sending at least one of the following to a service node:

a UE identity assigned by a core network, a destination identity corresponding to an interested traffic type, and a transmission type corresponding to a destination identity.

13. The method according to claim 1, further comprising:

sending a service node forwarding SL data indication to a destination UE; and in response to the destination UE being in an idle or inactive state, entering, by the destination UE, an RRC connected state after receiving the service node forwarding SL data indication.

14. The method according to claim 1, wherein the transmission configuration information is sent by a service node;

the service node comprises a base station, a distributed unit (DU), a centralized unit (CU), or an integrated access backhaul (IAB) node.

15. A data transmission method, comprising:

receiving proximity information about a destination user equipment (UE); and sending transmission configuration information according to the proximity information; wherein a service node transmits data according to the transmission configuration information; wherein transmitting the data according to the transmission configuration information, comprises:

in response to the transmission configuration information comprising a Uu transmission path, or comprising Uu RLC channel configuration and an SL SRB associated with a Uu RLC channel, or comprising Uu RLC channel configuration and mapping information between an SL RB and a Uu RLC channel, transmitting corresponding SL RB data through a Uu interface;

in response to the transmission configuration information comprising an SL transmission path, or comprising at least one of SDAP configuration corresponding to an SL RB, PDCP configuration corresponding to an SL RB, PC5 RLC channel configuration and PC5 logical channel configuration, transmitting the corresponding SL RB data through a PC5 interface;

in response to the transmission configuration information comprising an SL transmission path and a Uu transmission path, or comprising Uu RLC channel configuration corresponding to an SL RB and PC5 RLC channel configuration, transmitting the corresponding SL RB data through at least one of a Uu interface and a PC5 interface.

16. The method according to claim 15, wherein, the proximity information is sent by a source UE, or sent by a network element of a core network.

17. A user equipment, comprising a memory, a processor, and a computer program stored on the memory and runnable on the processor, wherein the processor, upon executing the computer program, implements the following steps:

receiving transmission configuration information; and transmitting data according to the transmission configuration information; wherein transmitting the data according to the transmission configuration information, comprises:

in response to the transmission configuration information comprising a Uu transmission path, or comprising Uu RLC channel configuration and an SL SRB associated with a Uu RLC channel or comprising Uu RLC channel configuration and mapping information between an SL RB and a Uu RLC channel, transmitting corresponding SL RB data through a Uu interface;

in response to the transmission configuration information comprising an SL transmission path, or comprising at least one of SDAP configuration corresponding to an SL RB, PDCP configuration corresponding to an SL RB, PC5 RLC channel configuration and PC5 logical channel configuration, transmitting the corresponding SL RB data through a PC5 interface;

in response to the transmission configuration information comprising an SL transmission path and a Uu transmission path, or comprising Uu RLC channel configuration corresponding to an SL RB and PC5 RLC channel configuration, transmitting the corresponding SL RB data through at least one of a Uu interface and a PC5 interface.

18. A service node, comprising a memory, a processor, and a computer program stored on the memory and runnable on the processor, wherein the processor, upon executing the computer program, implements the data transmission method of claim 15.

19. A non-transitory computer-readable storage medium, having stored a computer program thereon, wherein the computer program, upon being executed by a processor, implements the data transmission method of claim 1.

* * * * *